United States Patent
Jhang et al.

(10) Patent No.: US 10,095,007 B1
(45) Date of Patent: Oct. 9, 2018

(54) OPTICAL IMAGING LENS

(71) Applicant: GENIUS ELECTRONIC OPTICAL CO., LTD., Taichung (TW)

(72) Inventors: Jia-Sin Jhang, Taichung (TW); Baina Chen, Xiamen (CN); Ruyou Tang, Xiamen (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 15/644,512

(22) Filed: Jul. 7, 2017

(30) Foreign Application Priority Data

Jun. 2, 2017 (CN) .......................... 2017 1 0407700

(51) Int. Cl.
  *G02B 3/02* (2006.01)
  *G02B 13/00* (2006.01)
  *G02B 9/62* (2006.01)

(52) U.S. Cl.
  CPC .......... *G02B 13/0045* (2013.01); *G02B 9/62* (2013.01)

(58) Field of Classification Search
  CPC ...... G02B 13/0045; G02B 9/62; G02B 13/18; G02B 3/04; G02B 13/002; G02B 27/0025; G02B 3/00; G02B 3/02
  See application file for complete search history.

(56) References Cited

U.S. PATENT DOCUMENTS

| | | | | |
|---|---|---|---|---|
| 8,780,465 | B2* | 7/2014 | Chae | G02B 13/0045 359/714 |
| 9,354,423 | B2* | 5/2016 | Park, II | G02B 9/62 |
| 2013/0033762 | A1* | 2/2013 | Tsai | G02B 13/0045 359/713 |
| 2013/0215520 | A1* | 8/2013 | Lai | G02B 13/0045 359/713 |
| 2014/0118817 | A1* | 5/2014 | Jung | G02B 13/0045 359/355 |
| 2015/0029599 | A1* | 1/2015 | Huang | G02B 3/04 359/713 |
| 2017/0371130 | A1* | 12/2017 | Huang | G02B 13/0045 |

* cited by examiner

*Primary Examiner* — Bumsuk Won
*Assistant Examiner* — Balram Parbadia
(74) *Attorney, Agent, or Firm* — Baker & McKenzie LLP

(57) ABSTRACT

Present embodiments provide for an optical imaging lens. The optical imaging lens includes a first lens element, a second lens element, a third lens element, a fourth lens element, a fifth lens element and a sixth lens element positioned sequentially from an object side to an image side. Through arrangement of convex or concave surfaces of the six lens elements, the length of the optical imaging lens may be shortened while providing better optical characteristics and imaging quality.

20 Claims, 36 Drawing Sheets

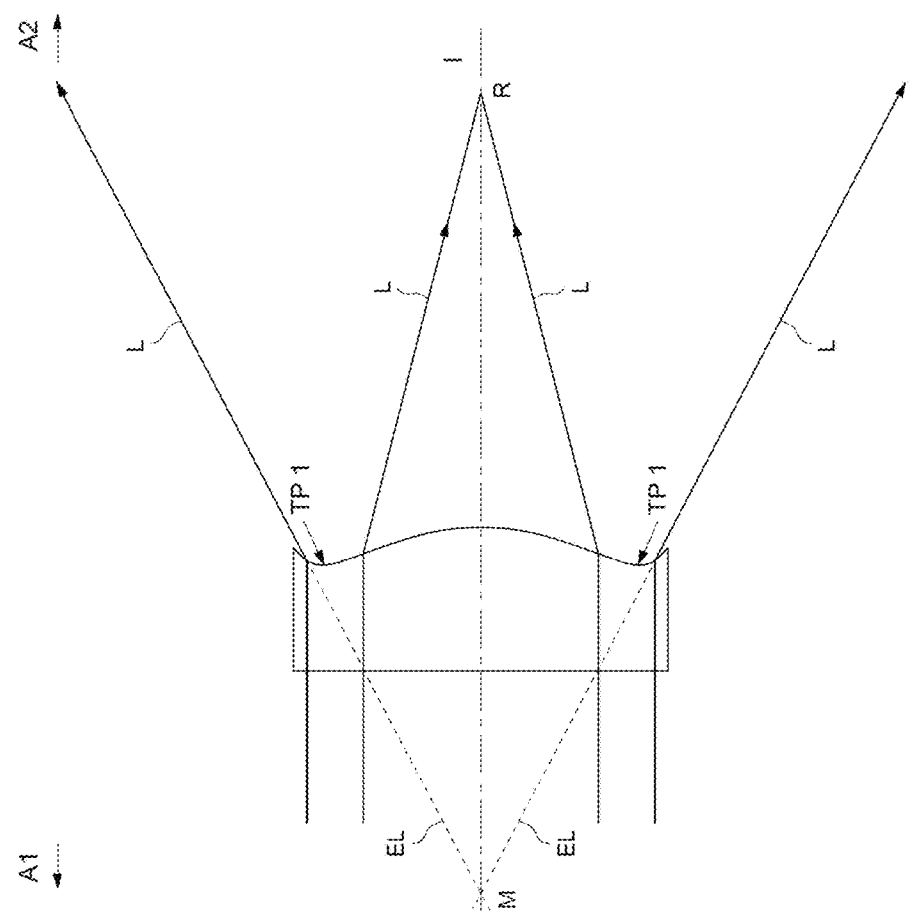
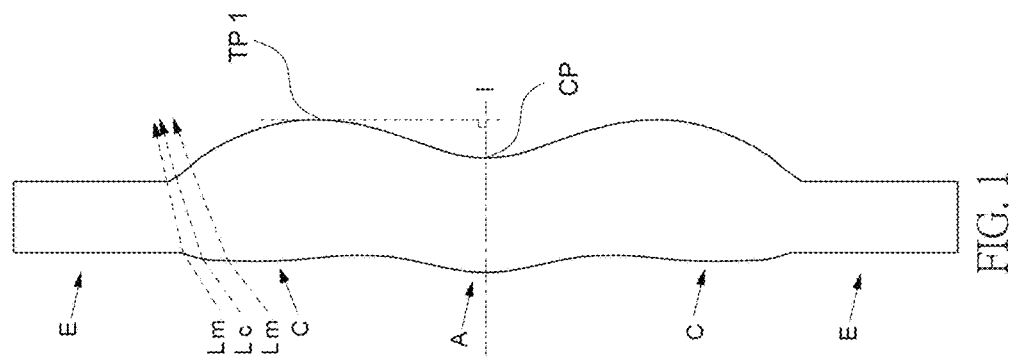
FIG. 2
FIG. 1

| Effective focal length (EFL) = 5.484 mm, HFOV (Half field of view) = 26.875 deg., TTL = 5.133 mm, Image height= 2.911 mm, Fno = 2.650 |||||||
|---|---|---|---|---|---|---|
| Surface # | | Radius (mm) | Thickness / air gap (mm) | Refractive index | Abbe number | Focal length (mm) |
| - | Object | ∞ | ∞ | | | |
| 100 | Aperture stop | ∞ | -0.433 | | | |
| 111 | 1st lens element | 1.430 | 0.929 | 1.545 | 55.987 | 2.697 |
| 112 | | 37.237 | 0.048 | | | |
| 121 | 2nd lens element | -168.676 | 0.210 | 1.661 | 20.412 | -3.941 |
| 122 | | 2.672 | 0.144 | | | |
| 131 | 3rd lens element | 2.166 | 0.210 | 1.545 | 55.987 | -151.294 |
| 132 | | 2.038 | 0.637 | | | |
| 141 | 4th lens element | -4.441 | 0.289 | 1.661 | 20.412 | 12.827 |
| 142 | | -3.000 | 0.376 | | | |
| 151 | 5th lens element | -11.522 | 0.208 | 1.545 | 55.987 | -17.357 |
| 152 | | 53.882 | 0.994 | | | |
| 161 | 6th lens element | -14.495 | 0.209 | 1.661 | 20.412 | -7.473 |
| 162 | | 7.644 | 0.350 | | | |
| 171 | IR cut filter | ∞ | 0.210 | 1.517 | 64.167 | |
| 172 | | ∞ | 0.320 | | | |
| 180 | Image plane | ∞ | 0.000 | | | |

FIG. 8

| Aspherical parameters | | | | |
|---|---|---|---|---|
| Surface # | K | A2 | A4 | A6 | A8 |
| 111 | 0.000000E+00 | 0.000000E+00 | -1.729177E-02 | 4.218123E-02 | -5.249977E-02 |
| 112 | 0.000000E+00 | 0.000000E+00 | 8.306674E-02 | 3.082709E-03 | -1.776917E-01 |
| 121 | 0.000000E+00 | 0.000000E+00 | 9.864843E-02 | -2.854190E-02 | -2.367469E-01 |
| 122 | 0.000000E+00 | 0.000000E+00 | -7.774726E-02 | 6.895865E-03 | 4.012145E-01 |
| 131 | 0.000000E+00 | 0.000000E+00 | -3.448587E-01 | 6.451217E-02 | 2.864344E-01 |
| 132 | 0.000000E+00 | 0.000000E+00 | -2.290914E-01 | 4.049059E-01 | -1.167664E+00 |
| 141 | 0.000000E+00 | 0.000000E+00 | -3.553547E-02 | -2.016663E-01 | 8.649349E-01 |
| 142 | 0.000000E+00 | 0.000000E+00 | -7.538919E-02 | 1.093090E-01 | -1.677594E-01 |
| 151 | 0.000000E+00 | 0.000000E+00 | -1.008643E-01 | -1.320749E-02 | 1.631177E-02 |
| 152 | 0.000000E+00 | 0.000000E+00 | -3.075025E-02 | -6.070677E-02 | 5.122695E-02 |
| 161 | 0.000000E+00 | 0.000000E+00 | -8.016791E-02 | 4.957459E-02 | -1.393648E-02 |
| 162 | 0.000000E+00 | 0.000000E+00 | -1.366408E-01 | 7.136330E-02 | -2.126616E-02 |
| Surface # | A10 | A12 | A14 | A16 | |
| 111 | 3.463352E-02 | -8.377173E-03 | -1.878406E-04 | 0.000000E+00 | |
| 112 | 2.344063E-01 | -1.001986E-01 | -6.530487E-03 | 0.000000E+00 | |
| 121 | 7.047227E-01 | -8.476399E-01 | 5.061042E-01 | -1.402475E-01 | |
| 122 | -7.108098E-01 | 1.334088E+00 | -1.340993E+00 | 5.701387E-01 | |
| 131 | 9.715754E-01 | -3.008761E+00 | 3.012217E+00 | -1.068623E+00 | |
| 132 | 3.996085E+00 | -6.862848E+00 | 5.580338E+00 | -1.747984E+00 | |
| 141 | -1.323208E+00 | 1.155194E+00 | -5.856923E-01 | 1.268262E-01 | |
| 142 | 4.180184E-01 | -4.224473E-01 | 1.772803E-01 | -2.679393E-02 | |
| 151 | 5.461131E-03 | -3.938262E-03 | 7.923505E-04 | -6.614107E-05 | |
| 152 | -2.171638E-02 | 5.209476E-03 | -6.882476E-04 | 5.927510E-05 | |
| 161 | 2.328360E-03 | -2.221324E-04 | 1.004472E-05 | -1.191811E-07 | |
| 162 | 4.079406E-03 | -4.805305E-04 | 3.108274E-05 | -8.465194E-07 | |

FIG. 9

| Effective focal length (EFL) = 5.158 mm, HFOV (Half field of view) = 26.875 deg., TTL = 5.031 mm, Image height= 2.906 mm, Fno = 2.650 | | | | | | |
|---|---|---|---|---|---|---|
| Surface # | | Radius (mm) | Thickness / air gap (mm) | Refractive index | Abbe number | Focal length (mm) |
| - | Object | ∞ | ∞ | | | |
| 200 | Aperture stop | ∞ | -0.347 | | | |
| 211 | 1st lens element | 1.494 | 0.852 | 1.545 | 55.987 | 2.701 |
| 212 | | -95.967 | 0.048 | | | |
| 221 | 2nd lens element | -21.758 | 0.210 | 1.661 | 20.412 | -4.052 |
| 222 | | 3.099 | 0.111 | | | |
| 231 | 3rd lens element | 2.503 | 0.436 | 1.545 | 55.987 | 546.359 |
| 232 | | 2.368 | 0.528 | | | |
| 241 | 4th lens element | -6.284 | 0.346 | 1.661 | 20.412 | 9.699 |
| 242 | | -3.258 | 0.361 | | | |
| 251 | 5th lens element | -5.772 | 0.210 | 1.545 | 55.987 | -13.384 |
| 252 | | -27.759 | 0.983 | | | |
| 261 | 6th lens element | -12.213 | 0.210 | 1.661 | 20.412 | -6.430 |
| 262 | | 6.658 | 0.350 | | | |
| 271 | IR cut filter | ∞ | 0.210 | 1.517 | 64.167 | |
| 272 | | ∞ | 0.177 | | | |
| 280 | Image plane | ∞ | 0.000 | | | |

FIG. 12

| Aspherical parameters | | | | | |
|---|---|---|---|---|---|
| Surface # | K | A2 | A4 | A6 | A8 |
| 211 | 0.000000E+00 | 0.000000E+00 | -1.822686E-02 | 4.066922E-02 | -5.005379E-02 |
| 212 | 0.000000E+00 | 0.000000E+00 | 6.887472E-02 | 2.859490E-03 | -1.809896E-01 |
| 221 | 0.000000E+00 | 0.000000E+00 | 1.049386E-01 | -3.613993E-02 | -2.418456E-01 |
| 222 | 0.000000E+00 | 0.000000E+00 | -1.098547E-01 | 3.588746E-02 | 4.051294E-01 |
| 231 | 0.000000E+00 | 0.000000E+00 | -3.189053E-01 | 5.813569E-02 | 2.905088E-01 |
| 232 | 0.000000E+00 | 0.000000E+00 | -1.833109E-01 | 3.593725E-01 | -1.191719E+00 |
| 241 | 0.000000E+00 | 0.000000E+00 | -5.770417E-02 | -1.759812E-01 | 8.602718E-01 |
| 242 | 0.000000E+00 | 0.000000E+00 | -8.452238E-02 | 1.110416E-01 | -1.633181E-01 |
| 251 | 0.000000E+00 | 0.000000E+00 | -1.287575E-01 | -1.478667E-02 | 1.300404E-02 |
| 252 | 0.000000E+00 | 0.000000E+00 | -3.077839E-02 | -5.991368E-02 | 5.179025E-02 |
| 261 | 0.000000E+00 | 0.000000E+00 | -7.212592E-02 | 4.793201E-02 | -1.395837E-02 |
| 262 | 0.000000E+00 | 0.000000E+00 | -1.338671E-01 | 7.103994E-02 | -2.138490E-02 |
| Surface # | A10 | A12 | A14 | A16 | |
| 211 | 3.399659E-02 | -9.926812E-03 | 6.553195E-04 | 0.000000E+00 | |
| 212 | 2.351649E-01 | -1.005169E-01 | -1.400198E-02 | 0.000000E+00 | |
| 221 | 6.977797E-01 | -8.563647E-01 | 5.006115E-01 | -1.356362E-01 | |
| 222 | -7.206694E-01 | 1.310096E+00 | -1.365585E+00 | 5.465110E-01 | |
| 231 | 9.938879E-01 | -3.001469E+00 | 2.993584E+00 | -1.062054E+00 | |
| 232 | 4.016667E+00 | -6.837113E+00 | 5.589238E+00 | -1.753583E+00 | |
| 241 | -1.324567E+00 | 1.156355E+00 | -5.867798E-01 | 1.260259E-01 | |
| 242 | 4.191051E-01 | -4.237942E-01 | 1.762065E-01 | -2.730177E-02 | |
| 251 | 3.917103E-03 | -4.031137E-03 | 1.119183E-03 | 1.732915E-04 | |
| 252 | -2.183095E-02 | 5.133983E-03 | -6.712054E-04 | 9.709416E-05 | |
| 261 | 2.348106E-03 | -2.202442E-04 | 9.580503E-06 | -1.074436E-07 | |
| 262 | 4.086172E-03 | -4.792012E-04 | 3.123124E-05 | -8.792024E-07 | |

FIG. 13

| Effective focal length (EFL) = 5.598 mm, HFOV (Half field of view) = 26.875 deg., TTL = 5.145 mm, Image height= 2.909 mm, Fno = 2.650 ||||||
|---|---|---|---|---|---|---|
| Surface # | | Radius (mm) | Thickness / air gap (mm) | Refractive index | Abbe number | Focal length (mm) |
| -- | Object | ∞ | ∞ | | | |
| 300 | Aperture stop | ∞ | -0.483 | | | |
| 311 | 1st lens element | 1.402 | 0.747 | 1.545 | 55.987 | 2.684 |
| 312 | | 25.961 | 0.058 | | | |
| 321 | 2nd lens element | -115.270 | 0.222 | 1.661 | 20.412 | -3.963 |
| 322 | | 2.708 | 0.177 | | | |
| 331 | 3rd lens element | 2.254 | 0.222 | 1.545 | 55.987 | -64.639 |
| 332 | | 2.045 | 0.397 | | | |
| 341 | 4th lens element | -16.778 | 0.226 | 1.661 | 20.412 | 16.684 |
| 342 | | -6.728 | 1.411 | | | |
| 351 | 5th lens element | -4.996 | 0.210 | 1.545 | 55.987 | -17.728 |
| 352 | | -10.473 | 0.045 | | | |
| 361 | 6th lens element | -48412.081 | 0.259 | 1.661 | 20.412 | -10.096 |
| 362 | | 6.737 | 0.350 | | | |
| 371 | IR cut filter | ∞ | 0.210 | 1.517 | 64.167 | |
| 372 | | ∞ | 0.610 | | | |
| 380 | Image plane | ∞ | 0.000 | | | |

FIG. 16

| Aspherical parameters | | | | | |
|---|---|---|---|---|---|
| Surface # | K | A2 | A4 | A6 | A8 |
| 311 | 0.000000E+00 | 0.000000E+00 | -1.601111E-02 | 4.948585E-02 | -5.435747E-02 |
| 312 | 0.000000E+00 | 0.000000E+00 | 8.673476E-02 | 7.182855E-03 | -1.741160E-01 |
| 321 | 0.000000E+00 | 0.000000E+00 | 9.149722E-02 | -2.630828E-02 | -2.356931E-01 |
| 322 | 0.000000E+00 | 0.000000E+00 | -5.885440E-02 | -1.120810E-02 | 4.102814E-01 |
| 331 | 0.000000E+00 | 0.000000E+00 | -3.219199E-01 | 8.806178E-02 | 2.716417E-01 |
| 332 | 0.000000E+00 | 0.000000E+00 | -2.687190E-01 | 4.246979E-01 | -1.118540E+00 |
| 341 | 0.000000E+00 | 0.000000E+00 | -2.409704E-02 | -1.877142E-01 | 8.644668E-01 |
| 342 | 0.000000E+00 | 0.000000E+00 | -2.284653E-02 | 1.152274E-01 | -1.730984E-01 |
| 351 | 0.000000E+00 | 0.000000E+00 | -9.818219E-02 | -1.819407E-02 | 1.674409E-02 |
| 352 | 0.000000E+00 | 0.000000E+00 | -2.751643E-02 | -6.192229E-02 | 5.305515E-02 |
| 361 | 0.000000E+00 | 0.000000E+00 | -7.249862E-02 | 4.780527E-02 | -1.394349E-02 |
| 362 | 0.000000E+00 | 0.000000E+00 | -1.308910E-01 | 7.122636E-02 | -2.138842E-02 |
| Surface # | A10 | A12 | A14 | A16 | |
| 311 | 3.370461E-02 | -7.398260E-03 | 3.659262E-04 | 0.000000E+00 | |
| 312 | 2.353821E-01 | -9.814706E-02 | -1.175962E-03 | 0.000000E+00 | |
| 321 | 7.109818E-01 | -8.424725E-01 | 5.078230E-01 | -1.359890E-01 | |
| 322 | -7.154476E-01 | 1.319687E+00 | -1.334450E+00 | 6.015991E-01 | |
| 331 | 9.863699E-01 | -3.004027E+00 | 2.994842E+00 | -1.062741E+00 | |
| 332 | 4.002724E+00 | -6.864087E+00 | 5.574924E+00 | -1.752298E+00 | |
| 341 | -1.317716E+00 | 1.152467E+00 | -5.851452E-01 | 1.268048E-01 | |
| 342 | 4.150167E-01 | -4.267254E-01 | 1.791019E-01 | -2.656708E-02 | |
| 351 | 5.308180E-03 | -4.115747E-03 | 7.898442E-04 | -5.032314E-05 | |
| 352 | -2.146764E-02 | 5.163920E-03 | -7.231982E-04 | 4.643253E-05 | |
| 361 | 2.349407E-03 | -2.203558E-04 | 9.569772E-06 | -1.080611E-07 | |
| 362 | 4.086478E-03 | -4.793355E-04 | 3.122395E-05 | -8.815003E-07 | |

FIG. 17

| Effective focal length (EFL) = 5.399 mm, HFOV (Half field of view) = 26.291 deg., TTL = 5.399 mm, Image height= 2.838 mm, Fno = 2.650 ||||||
|---|---|---|---|---|---|---|
| Surface # | | Radius (mm) | Thickness / air gap (mm) | Refractive index | Abbe number | Focal length (mm) |
| - | Object | ∞ | ∞ | | | |
| 400 | Aperture stop | ∞ | -0.431 | | | |
| 411 | 1st lens element | 1.432 | 0.589 | 1.545 | 55.987 | 2.708 |
| 412 | | 37.756 | 0.048 | | | |
| 421 | 2nd lens element | 40.748 | 0.288 | 1.661 | 20.412 | -4.061 |
| 422 | | 2.533 | 0.110 | | | |
| 431 | 3rd lens element | 1.796 | 0.357 | 1.545 | 55.987 | 21.208 |
| 432 | | 1.976 | 0.239 | | | |
| 441 | 4th lens element | 13.837 | 0.719 | 1.661 | 20.412 | 20.739 |
| 442 | | -8.831E+10 | 0.658 | | | |
| 451 | 5th lens element | -2.767 | 1.214 | 1.545 | 55.987 | -10.749 |
| 452 | | -6.042 | 0.045 | | | |
| 461 | 6th lens element | -8.314 | 0.472 | 1.661 | 20.412 | -5.989 |
| 462 | | 7.867 | 0.350 | | | |
| 471 | IR cut filter | ∞ | 0.210 | 1.517 | 64.167 | |
| 472 | | ∞ | 0.100 | | | |
| 480 | Image plane | ∞ | 0.000 | | | |

FIG. 20

| Aspherical parameters | | | | | |
|---|---|---|---|---|---|
| Surface # | K | A2 | A4 | A6 | A8 |
| 411 | 0.000000E+00 | 0.000000E+00 | -1.530034E-02 | 5.323834E-02 | -5.732628E-02 |
| 412 | 0.000000E+00 | 0.000000E+00 | 8.426040E-02 | 1.291696E-02 | -1.678627E-01 |
| 421 | 0.000000E+00 | 0.000000E+00 | 1.030853E-01 | -3.350519E-02 | -2.373840E-01 |
| 422 | 0.000000E+00 | 0.000000E+00 | -8.928213E-02 | 1.983214E-02 | 4.259727E-01 |
| 431 | 0.000000E+00 | 0.000000E+00 | -3.165026E-01 | 1.023201E-01 | 2.776180E-01 |
| 432 | 0.000000E+00 | 0.000000E+00 | -2.802675E-01 | 4.051599E-01 | -1.058303E+00 |
| 441 | 0.000000E+00 | 0.000000E+00 | -6.342636E-02 | -1.806279E-01 | 8.732289E-01 |
| 442 | 0.000000E+00 | 0.000000E+00 | -8.879146E-03 | 9.028835E-02 | -1.831289E-01 |
| 451 | 0.000000E+00 | 0.000000E+00 | -6.334343E-02 | -1.762255E-02 | 2.163309E-02 |
| 452 | 0.000000E+00 | 0.000000E+00 | 3.408124E-03 | -6.061227E-02 | 5.071046E-02 |
| 461 | 0.000000E+00 | 0.000000E+00 | -8.144938E-02 | 4.915913E-02 | -1.386538E-02 |
| 462 | 0.000000E+00 | 0.000000E+00 | -1.342060E-01 | 7.010430E-02 | -2.145838E-02 |
| Surface # | A10 | A12 | A14 | A16 | |
| 411 | 3.344613E-02 | -6.332725E-03 | 2.893067E-03 | 0.000000E+00 | |
| 412 | 2.380945E-01 | -9.788153E-02 | 2.542789E-04 | 0.000000E+00 | |
| 421 | 7.117002E-01 | -8.384478E-01 | 5.092826E-01 | -1.383123E-01 | |
| 422 | -7.166783E-01 | 1.280035E+00 | -1.366745E+00 | 5.855851E-01 | |
| 431 | 9.728247E-01 | -3.025626E+00 | 2.975577E+00 | -1.057643E+00 | |
| 432 | 4.006561E+00 | -6.914560E+00 | 5.531722E+00 | -1.741715E+00 | |
| 441 | -1.320892E+00 | 1.138176E+00 | -5.933623E-01 | 1.045893E-01 | |
| 442 | 4.210145E-01 | -4.198169E-01 | 1.782326E-01 | -2.643674E-02 | |
| 451 | 6.421884E-03 | -3.901276E-03 | 6.671811E-04 | -1.040336E-04 | |
| 452 | -2.136611E-02 | 5.244914E-03 | -7.183054E-04 | 4.153090E-05 | |
| 461 | 2.314817E-03 | -2.233651E-04 | 9.867118E-06 | -1.268007E-07 | |
| 462 | 4.101053E-03 | -4.776382E-04 | 3.118839E-05 | -9.084295E-07 | |

FIG. 21

| Effective focal length (EFL) = 5.371 mm, HFOV (Half field of view) = 26.867 deg., TTL = 5.184 mm, Image height = 2.912 mm, Fno = 2.650 ||||||
|---|---|---|---|---|---|
| Surface # | | Radius (mm) | Thickness / air gap (mm) | Refractive index | Abbe number | Focal length (mm) |
| - | Object | ∞ | ∞ | | | |
| 500 | Aperture stop | ∞ | -0.422 | | | |
| 511 | 1st lens element | 1.460 | 0.566 | 1.545 | 55.987 | 2.766 |
| 512 | | 37.349 | 0.044 | | | |
| 521 | 2nd lens element | 36.302 | 0.210 | 1.661 | 20.412 | -4.022 |
| 522 | | 2.493 | 0.091 | | | |
| 531 | 3rd lens element | 1.765 | 0.210 | 1.545 | 55.987 | -730.295 |
| 532 | | 1.683 | 0.611 | | | |
| 541 | 4th lens element | -26.105 | 0.244 | 1.661 | 20.412 | 13.334 |
| 542 | | -6.660 | 1.469 | | | |
| 551 | 5th lens element | -6.194 | 0.210 | 1.545 | 55.987 | -20.808 |
| 552 | | -13.774 | 0.659 | | | |
| 561 | 6th lens element | -8.715 | 0.210 | 1.661 | 20.412 | -10.271 |
| 562 | | 32.378 | 0.350 | | | |
| 571 | IR cut filter | ∞ | 0.210 | 1.517 | 64.167 | |
| 572 | | ∞ | 0.100 | | | |
| 580 | Image plane | ∞ | 0.000 | | | |

FIG. 24

| Aspherical parameters | | | | | |
|---|---|---|---|---|---|
| Surface # | K | A2 | A4 | A6 | A8 |
| 511 | 0.000000E+00 | 0.000000E+00 | -1.028036E-02 | 5.464517E-02 | -5.986785E-02 |
| 512 | 0.000000E+00 | 0.000000E+00 | 8.893979E-02 | 1.644344E-02 | -1.657266E-01 |
| 521 | 0.000000E+00 | 0.000000E+00 | 1.062991E-01 | -2.570204E-02 | -2.363370E-01 |
| 522 | 0.000000E+00 | 0.000000E+00 | -7.529251E-02 | -5.108205E-03 | 4.394529E-01 |
| 531 | 0.000000E+00 | 0.000000E+00 | -3.361063E-01 | 1.129728E-01 | 2.841183E-01 |
| 532 | 0.000000E+00 | 0.000000E+00 | -2.237486E-01 | 3.731524E-01 | -1.132789E+00 |
| 541 | 0.000000E+00 | 0.000000E+00 | -3.543097E-02 | -2.125349E-01 | 8.565912E-01 |
| 542 | 0.000000E+00 | 0.000000E+00 | -5.163418E-02 | 9.060979E-02 | -1.704355E-01 |
| 551 | 0.000000E+00 | 0.000000E+00 | -9.339807E-02 | -1.957881E-02 | 1.635905E-02 |
| 552 | 0.000000E+00 | 0.000000E+00 | -3.678308E-02 | -5.840371E-02 | 5.302296E-02 |
| 561 | 0.000000E+00 | 0.000000E+00 | -7.751410E-02 | 4.819022E-02 | -1.388929E-02 |
| 562 | 0.000000E+00 | 0.000000E+00 | -1.267054E-01 | 7.074532E-02 | -2.143313E-02 |
| Surface # | A10 | A12 | A14 | A16 | |
| 511 | 3.485516E-02 | -4.433899E-03 | 3.211171E-03 | 0.000000E+00 | |
| 512 | 2.389320E-01 | -9.573405E-02 | 2.622517E-03 | 0.000000E+00 | |
| 521 | 7.160833E-01 | -8.374855E-01 | 5.092774E-01 | -1.386677E-01 | |
| 522 | -7.122602E-01 | 1.296447E+00 | -1.362521E+00 | 5.687353E-01 | |
| 531 | 9.750906E-01 | -3.035394E+00 | 2.953697E+00 | -1.028032E+00 | |
| 532 | 3.981964E+00 | -6.878689E+00 | 5.583416E+00 | -1.755137E+00 | |
| 541 | -1.311450E+00 | 1.162464E+00 | -5.862977E-01 | 1.238639E-01 | |
| 542 | 4.217059E-01 | -4.205499E-01 | 1.773342E-01 | -2.700641E-02 | |
| 551 | 5.323952E-03 | -4.092319E-03 | 7.920064E-04 | -5.133644E-05 | |
| 552 | -2.136458E-02 | 5.190234E-03 | -7.265397E-04 | 4.447404E-05 | |
| 561 | 2.350626E-03 | -2.210314E-04 | 9.391030E-06 | -8.755829E-08 | |
| 562 | 4.086241E-03 | -4.786959E-04 | 3.131160E-05 | -8.890002E-07 | |

FIG. 25

| Effective focal length (EFL) = 5.336 mm, HFOV (Half field of view) = 26.869 deg, TTL = 5.015 mm, Image height= 2.911 mm, Fno = 2.650 ||||||
|---|---|---|---|---|---|---|
| Surface # | | Radius (mm) | Thickness / air gap (mm) | Refractive index | Abbe number | Focal length (mm) |
| - | Object | ∞ | ∞ | | | |
| 600 | Aperture stop | ∞ | -0.438 | | | |
| 611 | 1st lens element | 1.409 | 0.609 | 1.545 | 55.987 | 2.664 |
| 612 | | 37.708 | 0.154 | | | |
| 621 | 2nd lens element | -3161.711 | 0.210 | 1.661 | 20.412 | -3.995 |
| 622 | | 2.668 | 0.258 | | | |
| 631 | 3rd lens element | 2.056 | 0.210 | 1.545 | 55.987 | 90.517 |
| 632 | | 2.067 | 0.342 | | | |
| 641 | 4th lens element | 72.635 | 0.328 | 1.661 | 20.412 | 16.610 |
| 642 | | -13.053 | 1.187 | | | |
| 651 | 5th lens element | -7.565 | 0.215 | 1.545 | 55.987 | -6.881 |
| 652 | | 7.547 | 0.197 | | | |
| 661 | 6th lens element | -5.792 | 0.645 | 1.661 | 20.412 | -16.319 |
| 662 | | -12.926 | 0.350 | | | |
| 671 | IR cut filter | ∞ | 0.210 | 1.517 | 64.167 | |
| 672 | | ∞ | 0.100 | | | |
| 680 | Image plane | ∞ | 0.000 | | | |

FIG. 28

| Aspherical parameters | | | | | |
|---|---|---|---|---|---|
| Surface # | K | A2 | A4 | A6 | A8 |
| 611 | 0.000000E+00 | 0.000000E+00 | -4.762437E-03 | 4.297184E-02 | -4.424025E-02 |
| 612 | 0.000000E+00 | 0.000000E+00 | 8.751491E-02 | 1.070295E-02 | -1.730362E-01 |
| 621 | 0.000000E+00 | 0.000000E+00 | 8.639566E-02 | -2.576903E-02 | -2.222051E-01 |
| 622 | 0.000000E+00 | 0.000000E+00 | -3.942330E-02 | 2.312655E-03 | 3.878542E-01 |
| 631 | 0.000000E+00 | 0.000000E+00 | -3.074028E-01 | 1.018076E-01 | 2.653745E-01 |
| 632 | 0.000000E+00 | 0.000000E+00 | -2.744123E-01 | 4.099103E-01 | -1.036349E+00 |
| 641 | 0.000000E+00 | 0.000000E+00 | 3.278360E-03 | -1.829099E-01 | 8.605611E-01 |
| 642 | 0.000000E+00 | 0.000000E+00 | 9.952936E-03 | 1.086131E-01 | -1.823549E-01 |
| 651 | 0.000000E+00 | 0.000000E+00 | -8.719429E-02 | -2.210410E-02 | 1.655589E-02 |
| 652 | 0.000000E+00 | 0.000000E+00 | -2.637756E-02 | -5.610498E-02 | 5.102376E-02 |
| 661 | 0.000000E+00 | 0.000000E+00 | -5.433266E-02 | 4.624669E-02 | -1.411917E-02 |
| 662 | 0.000000E+00 | 0.000000E+00 | -1.272026E-01 | 7.153137E-02 | -2.140434E-02 |
| Surface # | A10 | A12 | A14 | A16 | |
| 611 | 3.117335E-02 | -1.047550E-02 | 6.480832E-03 | 0.000000E+00 | |
| 612 | 2.385373E-01 | -9.817716E-02 | -4.429583E-03 | 0.000000E+00 | |
| 621 | 7.035945E-01 | -8.450721E-01 | 5.075952E-01 | -1.499082E-01 | |
| 622 | -6.921230E-01 | 1.310062E+00 | -1.380267E+00 | 6.186522E-01 | |
| 631 | 9.615341E-01 | -2.990551E+00 | 2.895800E+00 | -9.804684E-01 | |
| 632 | 4.004857E+00 | -6.983587E+00 | 5.546751E+00 | -1.669728E+00 | |
| 641 | -1.327509E+00 | 1.149184E+00 | -5.867949E-01 | 1.322039E-01 | |
| 642 | 4.158561E-01 | -4.225417E-01 | 1.775749E-01 | -2.595909E-02 | |
| 651 | 5.355035E-03 | -4.120823E-03 | 7.934289E-04 | -5.102235E-05 | |
| 652 | -2.152562E-02 | 5.212616E-03 | -7.194563E-04 | 4.333813E-05 | |
| 661 | 2.340465E-03 | -2.168075E-04 | 9.683337E-06 | -1.125406E-07 | |
| 662 | 4.086029E-03 | -4.792396E-04 | 3.125612E-05 | -8.827343E-07 | |

FIG. 29

| Effective focal length (EFL) = 5.419 mm, HFOV (Half field of view) = 26.869 deg, TTL = 5.319 mm, Image height = 2.912 mm, Fno = 2.650 ||||||
|---|---|---|---|---|---|---|
| Surface # | | Radius (mm) | Thickness / air gap (mm) | Refractive index | Abbe number | Focal length (mm) |
| - | Object | ∞ | ∞ | | | |
| 700 | Aperture stop | ∞ | -0.452 | | | |
| 711 | 1st lens element | 1.397 | 0.655 | 1.545 | 55.987 | 2.659 |
| 712 | | 30.176 | 0.049 | | | |
| 721 | 2nd lens element | -5293.616 | 0.210 | 1.661 | 20.412 | -3.989 |
| 722 | | 2.663 | 0.101 | | | |
| 731 | 3rd lens element | 1.861 | 0.210 | 1.545 | 55.987 | 72.815 |
| 732 | | 1.875 | 0.361 | | | |
| 741 | 4th lens element | 354.984 | 0.377 | 1.661 | 20.412 | 21.572 |
| 742 | | -14.994 | 0.942 | | | |
| 751 | 5th lens element | -9.271 | 0.893 | 1.545 | 55.987 | -8.528 |
| 752 | | 9.683 | 0.309 | | | |
| 761 | 6th lens element | -74662.535 | 0.385 | 1.661 | 20.412 | -17.150 |
| 762 | | 11.444 | 0.350 | | | |
| 771 | IR cut filter | ∞ | 0.210 | 1.517 | 0.000 | |
| 772 | | ∞ | 0.267 | | | |
| 780 | Image plane | ∞ | 0.000 | | | |

FIG. 32

| Aspherical parameters | | | | | |
|---|---|---|---|---|---|
| Surface # | K | A2 | A4 | A6 | A8 |
| 711 | 0.000000E+00 | 0.000000E+00 | -1.227674E-02 | 4.820700E-02 | -4.997180E-02 |
| 712 | 0.000000E+00 | 0.000000E+00 | 7.627655E-02 | 9.315992E-03 | -1.684387E-01 |
| 721 | 0.000000E+00 | 0.000000E+00 | 1.018765E-01 | -2.697038E-02 | -2.366247E-01 |
| 722 | 0.000000E+00 | 0.000000E+00 | -6.061682E-02 | 7.709869E-03 | 4.435651E-01 |
| 731 | 0.000000E+00 | 0.000000E+00 | -3.352542E-01 | 1.254438E-01 | 3.208771E-01 |
| 732 | 0.000000E+00 | 0.000000E+00 | -2.370710E-01 | 4.080037E-01 | -1.095229E+00 |
| 741 | 0.000000E+00 | 0.000000E+00 | -1.508142E-02 | -2.186638E-01 | 8.538489E-01 |
| 742 | 0.000000E+00 | 0.000000E+00 | -2.909288E-02 | 8.728341E-02 | -1.778433E-01 |
| 751 | 0.000000E+00 | 0.000000E+00 | -6.020476E-02 | -2.600300E-02 | 1.597437E-02 |
| 752 | 0.000000E+00 | 0.000000E+00 | 6.162449E-03 | -6.484939E-02 | 5.058109E-02 |
| 761 | 0.000000E+00 | 0.000000E+00 | -7.517510E-02 | 4.802576E-02 | -1.391574E-02 |
| 762 | 0.000000E+00 | 0.000000E+00 | -1.232509E-01 | 7.061795E-02 | -2.148721E-02 |
| Surface # | A10 | A12 | A14 | A16 | |
| 711 | 2.909122E-02 | -6.184791E-03 | 2.756572E-03 | 0.000000E+00 | |
| 712 | 2.383738E-01 | -9.825248E-02 | -2.660227E-03 | 0.000000E+00 | |
| 721 | 7.122848E-01 | -8.415779E-01 | 5.078846E-01 | -1.396931E-01 | |
| 722 | -6.936209E-01 | 1.284229E+00 | -1.369221E+00 | 6.106917E-01 | |
| 731 | 9.559251E-01 | -3.019397E+00 | 2.961865E+00 | -1.042303E+00 | |
| 732 | 4.037509E+00 | -6.898426E+00 | 5.535023E+00 | -1.733566E+00 | |
| 741 | -1.269019E+00 | 1.149661E+00 | -6.230308E-01 | 1.447716E-01 | |
| 742 | 4.176347E-01 | -4.130885E-01 | 1.791244E-01 | -2.975112E-02 | |
| 751 | 4.106943E-03 | -4.046031E-03 | 1.086388E-03 | -1.027878E-04 | |
| 752 | -2.129360E-02 | 5.268379E-03 | -7.144852E-04 | 4.080266E-05 | |
| 761 | 2.338029E-03 | -2.215683E-04 | 9.578570E-06 | -7.627526E-08 | |
| 762 | 4.084634E-03 | -4.787967E-04 | 3.131062E-05 | -8.787205E-07 | |

FIG. 33

| Effective focal length (EFL) = 5.579 mm, HFOV (Half field of view) = 26.869 deg., TTL = 5.318 mm, Image height = 2.910 mm, Fno = 2.650 ||||||
|---|---|---|---|---|---|---|
| Surface # | | Radius (mm) | Thickness / air gap (mm) | Refractive index | Abbe number | Focal length (mm) |
| - | Object | ∞ | ∞ | | | |
| 800 | Aperture stop | ∞ | -0.487 | | | |
| 811 | 1st lens element | 1.390 | 0.639 | 1.545 | 55.987 | 2.666 |
| 812 | | 25.662 | 0.076 | | | |
| 821 | 2nd lens element | 83.554 | 0.231 | 1.661 | 20.412 | -3.998 |
| 822 | | 2.582 | 0.205 | | | |
| 831 | 3rd lens element | 1.988 | 0.262 | 1.545 | 55.987 | 63.192 |
| 832 | | 2.012 | 0.535 | | | |
| 841 | 4th lens element | -42.210 | 0.347 | 1.661 | 20.412 | 17.099 |
| 842 | | -9.010 | 0.386 | | | |
| 851 | 5th lens element | -19.242 | 0.509 | 1.545 | 55.987 | -9.451 |
| 852 | | 7.122 | 0.422 | | | |
| 861 | 6th lens element | -963231.776 | 0.617 | 1.661 | 20.412 | -10.251 |
| 862 | | 6.840 | 0.350 | | | |
| 871 | IR cut filter | ∞ | 0.210 | 1.517 | 64.167 | |
| 872 | | ∞ | 0.530 | | | |
| 880 | Image plane | ∞ | 0.000 | | | |

FIG. 36

| Aspherical parameters | | | | | |
|---|---|---|---|---|---|
| Surface # | K | A2 | A4 | A6 | A8 |
| 811 | 0.000000E+00 | 0.000000E+00 | -1.593953E-02 | 4.904423E-02 | -5.513589E-02 |
| 812 | 0.000000E+00 | 0.000000E+00 | 8.853642E-02 | 8.412036E-03 | -1.736797E-01 |
| 821 | 0.000000E+00 | 0.000000E+00 | 9.881063E-02 | -2.640786E-02 | -2.342479E-01 |
| 822 | 0.000000E+00 | 0.000000E+00 | -7.046933E-02 | 9.183465E-03 | 4.079800E-01 |
| 831 | 0.000000E+00 | 0.000000E+00 | -3.347847E-01 | 8.050528E-02 | 2.839473E-01 |
| 832 | 0.000000E+00 | 0.000000E+00 | -2.690918E-01 | 4.181082E-01 | -1.129119E+00 |
| 841 | 0.000000E+00 | 0.000000E+00 | -2.616636E-02 | -1.981536E-01 | 8.529896E-01 |
| 842 | 0.000000E+00 | 0.000000E+00 | -4.940202E-02 | 1.124775E-01 | -1.685348E-01 |
| 851 | 0.000000E+00 | 0.000000E+00 | -9.215563E-02 | -1.402680E-02 | 1.874670E-02 |
| 852 | 0.000000E+00 | 0.000000E+00 | -1.503065E-02 | -6.409278E-02 | 5.161423E-02 |
| 861 | 0.000000E+00 | 0.000000E+00 | -7.313331E-02 | 4.774680E-02 | -1.395899E-02 |
| 862 | 0.000000E+00 | 0.000000E+00 | -1.336257E-01 | 7.115800E-02 | -2.139240E-02 |
| Surface # | A10 | A12 | A14 | A16 | |
| 811 | 3.512732E-02 | -6.675301E-03 | 1.910301E-04 | 0.000000E+00 | |
| 812 | 2.357533E-01 | -9.746052E-02 | -1.964943E-04 | 0.000000E+00 | |
| 821 | 7.129260E-01 | -8.416884E-01 | 5.080115E-01 | -1.367668E-01 | |
| 822 | -7.218473E-01 | 1.314289E+00 | -1.338349E+00 | 6.094216E-01 | |
| 831 | 9.890738E-01 | -3.010461E+00 | 2.981027E+00 | -1.057229E+00 | |
| 832 | 4.019653E+00 | -6.848122E+00 | 5.580395E+00 | -1.774493E+00 | |
| 841 | -1.317489E+00 | 1.162394E+00 | -5.850874E-01 | 1.248996E-01 | |
| 842 | 4.185531E-01 | -4.223947E-01 | 1.773646E-01 | -2.679016E-02 | |
| 851 | 5.279582E-03 | -4.188023E-03 | 7.656973E-04 | -6.568628E-05 | |
| 852 | -2.156664E-02 | 5.176282E-03 | -7.225863E-04 | 4.469562E-05 | |
| 861 | 2.344835E-03 | -2.208949E-04 | 9.497926E-06 | -9.903190E-08 | |
| 862 | 4.086357E-03 | -4.794531E-04 | 3.120233E-05 | -8.833034E-07 | |

FIG. 37

| Surface # | | Radius (mm) | Thickness / air gap (mm) | Refractive index | Abbe number | Focal length (mm) |
|---|---|---|---|---|---|---|
| | Effective focal length (EFL) = 5.399 mm, HFOV (Half field of view) = 26.871 deg., TTL = 5.127 mm, Image height= 2.913 mm, Fno = 2.650 | | | | | |
| - | Object | ∞ | ∞ | | | |
| 900 | Aperture stop | ∞ | -0.367 | | | |
| 911 | 1st lens element | 1.528 | 1.175 | 1.545 | 55.987 | 2.835 |
| 912 | | 84.187 | 0.054 | | | |
| 921 | 2nd lens element | -24.943 | 0.209 | 1.661 | 20.412 | -4.069 |
| 922 | | 3.056 | 0.105 | | | |
| 931 | 3rd lens element | 2.387 | 0.209 | 1.545 | 55.987 | -30.406 |
| 932 | | 2.023 | 0.176 | | | |
| 941 | 4th lens element | 7.785 | 0.227 | 1.661 | 20.412 | 11.668 |
| 942 | | -1064086.575 | 1.395 | | | |
| 951 | 5th lens element | -3.606 | 0.209 | 1.545 | 55.987 | -7.597 |
| 952 | | -28.081 | 0.045 | | | |
| 961 | 6th lens element | -35.977 | 0.476 | 1.661 | 20.412 | -25.803 |
| 962 | | 33.187 | 0.350 | | | |
| 971 | IR cut filter | ∞ | 0.210 | 1.517 | 64.167 | |
| 972 | | ∞ | 0.286 | | | |
| 980 | Image plane | ∞ | 0.000 | | | |

FIG. 40

| | Aspherical parameters | | | | |
|---|---|---|---|---|---|
| Surface # | K | A2 | A4 | A6 | A8 |
| 911 | 0.000000E+00 | 0.000000E+00 | -2.208240E-02 | 4.057305E-02 | -5.338728E-02 |
| 912 | 0.000000E+00 | 0.000000E+00 | 7.458731E-02 | -2.860525E-03 | -1.782008E-01 |
| 921 | 0.000000E+00 | 0.000000E+00 | 9.057309E-02 | -3.071939E-02 | -2.386584E-01 |
| 922 | 0.000000E+00 | 0.000000E+00 | -7.775742E-02 | -3.590899E-03 | 4.079204E-01 |
| 931 | 0.000000E+00 | 0.000000E+00 | -3.182820E-01 | 6.721214E-02 | 3.001689E-01 |
| 932 | 0.000000E+00 | 0.000000E+00 | -2.822761E-01 | 3.949621E-01 | -1.147966E+00 |
| 941 | 0.000000E+00 | 0.000000E+00 | -3.367623E-03 | -2.056026E-01 | 8.457574E-01 |
| 942 | 0.000000E+00 | 0.000000E+00 | 9.604222E-03 | 1.224690E-01 | -1.853975E-01 |
| 951 | 0.000000E+00 | 0.000000E+00 | -9.534532E-02 | -1.922030E-02 | 1.636176E-02 |
| 952 | 0.000000E+00 | 0.000000E+00 | -2.750817E-02 | -5.800971E-02 | 5.226301E-02 |
| 961 | 0.000000E+00 | 0.000000E+00 | -7.299335E-02 | 4.777214E-02 | -1.396570E-02 |
| 962 | 0.000000E+00 | 0.000000E+00 | -1.335879E-01 | 7.157335E-02 | -2.131531E-02 |
| Surface # | A10 | A12 | A14 | A16 | |
| 911 | 3.371639E-02 | -8.364820E-03 | -4.732128E-04 | 0.000000E+00 | |
| 912 | 2.375464E-01 | -1.095362E-01 | -1.961983E-02 | 0.000000E+00 | |
| 921 | 6.934329E-01 | -8.612449E-01 | 4.984604E-01 | -1.354580E-01 | |
| 922 | -7.391129E-01 | 1.303353E+00 | -1.372550E+00 | 5.470865E-01 | |
| 931 | 9.594778E-01 | -3.018277E+00 | 2.982197E+00 | -1.043627E+00 | |
| 932 | 4.000016E+00 | -6.878224E+00 | 5.582415E+00 | -1.721997E+00 | |
| 941 | -1.313753E+00 | 1.148219E+00 | -5.987496E-01 | 1.422919E-01 | |
| 942 | 3.977748E-01 | -4.219200E-01 | 1.817475E-01 | -2.644893E-02 | |
| 951 | 5.534165E-03 | -4.095658E-03 | 7.865223E-04 | -5.352564E-05 | |
| 952 | -2.160521E-02 | 5.174201E-03 | -7.213849E-04 | 4.368267E-05 | |
| 961 | 2.349815E-03 | -2.195751E-04 | 9.518477E-06 | -1.139200E-07 | |
| 962 | 4.087566E-03 | -4.800395E-04 | 3.117316E-05 | -8.798251E-07 | |

FIG. 41

| Effective focal length (EFL) = 5.084 mm, HFOV (Half field of view) = 26.867 deg., TTL = 4.830 mm, Image height= 2.908 mm, Fno = 2.650 ||||||
|---|---|---|---|---|---|
| Surface # | | Radius (mm) | Thickness / air gap (mm) | Refractive index | Abbe number | Focal length (mm) |
| - | Object | ∞ | ∞ | | | |
| 10'00 | Aperture stop | ∞ | -0.390 | | | |
| 10'11 | 1st lens element | 1.369 | 0.568 | 1.545 | 55.987 | 2.628 |
| 10'12 | | 25.353 | 0.060 | | | |
| 10'21 | 2nd lens element | 59.176 | 0.214 | 1.661 | 20.412 | -3.941 |
| 10'22 | | 2.514 | 0.154 | | | |
| 10'31 | 3rd lens element | 1.600 | 0.214 | 1.545 | 55.987 | 16.194 |
| 10'32 | | 1.861 | 0.964 | | | |
| 10'41 | 4th lens element | -3.641 | 0.220 | 1.661 | 20.412 | 22.461 |
| 10'42 | | -3.000 | 0.655 | | | |
| 10'51 | 5th lens element | -6.659 | 0.228 | 1.545 | 55.987 | -6.154 |
| 10'52 | | 6.872 | 0.130 | | | |
| 10'61 | 6th lens element | -39.569 | 0.632 | 1.661 | 20.412 | -14.120 |
| 10'62 | | 12.444 | 0.350 | | | |
| 10'71 | IR cut filter | ∞ | 0.210 | 1.517 | 64.167 | |
| 10'72 | | ∞ | 0.230 | | | |
| 10'80 | Image plane | ∞ | 0.000 | | | |

FIG. 44

| Aspherical parameters | | | | | |
|---|---|---|---|---|---|
| Surface # | K | A2 | A4 | A6 | A8 |
| 10'11 | 0.000000E+00 | 0.000000E+00 | -1.269718E-02 | 4.561021E-02 | -4.334952E-02 |
| 10'12 | 0.000000E+00 | 0.000000E+00 | 8.942222E-02 | 5.638184E-03 | -1.806408E-01 |
| 10'21 | 0.000000E+00 | 0.000000E+00 | 1.094758E-01 | -1.902462E-02 | -2.233898E-01 |
| 10'22 | 0.000000E+00 | 0.000000E+00 | -8.371501E-02 | 8.244815E-02 | 4.147711E-01 |
| 10'31 | 0.000000E+00 | 0.000000E+00 | -3.360679E-01 | 7.401012E-02 | 3.097518E-01 |
| 10'32 | 0.000000E+00 | 0.000000E+00 | -1.999813E-01 | 3.460766E-01 | -1.181628E+00 |
| 10'41 | 0.000000E+00 | 0.000000E+00 | -3.548331E-02 | -1.800292E-01 | 8.512988E-01 |
| 10'42 | 0.000000E+00 | 0.000000E+00 | -5.317275E-02 | 1.308510E-01 | -1.661970E-01 |
| 10'51 | 0.000000E+00 | 0.000000E+00 | -9.636086E-02 | -2.071181E-02 | 1.617347E-02 |
| 10'52 | 0.000000E+00 | 0.000000E+00 | -1.656082E-02 | -6.136957E-02 | 5.208651E-02 |
| 10'61 | 0.000000E+00 | 0.000000E+00 | -6.953427E-02 | 4.754865E-02 | -1.407345E-02 |
| 10'62 | 0.000000E+00 | 0.000000E+00 | -1.376496E-01 | 7.083712E-02 | -2.130339E-02 |
| Surface # | A10 | A12 | A14 | A16 | |
| 10'11 | 2.563280E-02 | -1.073281E-02 | 5.554752E-03 | 0.000000E+00 | |
| 10'12 | 2.383899E-01 | -9.549996E-02 | -4.198870E-03 | 0.000000E+00 | |
| 10'21 | 7.068551E-01 | -8.527825E-01 | 4.991234E-01 | -1.314959E-01 | |
| 10'22 | -6.920153E-01 | 1.293998E+00 | -1.414371E+00 | 6.209638E-01 | |
| 10'31 | 9.786610E-01 | -3.006499E+00 | 2.963999E+00 | -1.061465E+00 | |
| 10'32 | 4.059210E+00 | -6.798830E+00 | 5.608057E+00 | -1.830407E+00 | |
| 10'41 | -1.318288E+00 | 1.163140E+00 | -5.840933E-01 | 1.235752E-01 | |
| 10'42 | 4.175860E-01 | -4.232197E-01 | 1.770429E-01 | -2.651514E-02 | |
| 10'51 | 5.333782E-03 | -4.083359E-03 | 8.063094E-04 | -4.497689E-05 | |
| 10'52 | -2.147123E-02 | 5.188165E-03 | -7.236989E-04 | 4.452217E-05 | |
| 10'61 | 2.344072E-03 | -2.181804E-04 | 9.900341E-06 | -1.629353E-07 | |
| 10'62 | 4.094914E-03 | -4.794466E-04 | 3.111723E-05 | -8.978263E-07 | |

FIG. 45

| \multicolumn{6}{l}{Effective focal length (EFL) = 9.821 mm, HFOV (Half field of view) = 15.938 deg., TTL = 9.000 mm, Image height= 2.904 mm, Fno = 2.650} |
|---|---|---|---|---|---|
| Surface # | | Radius (mm) | Thickness / air gap (mm) | Refractive index | Abbe number | Focal length (mm) |
| - | Object | ∞ | ∞ | | | |
| 11'00 | Aperture stop | ∞ | -0.829 | | | |
| 11'11 | 1st lens element | 2.497 | 1.266 | 1.545 | 55.987 | 4.769 |
| 11'12 | | 49.216 | 0.116 | | | |
| 11'21 | 2nd lens element | -801.839 | 0.374 | 1.661 | 20.412 | -7.152 |
| 11'22 | | 4.801 | 0.315 | | | |
| 11'31 | 3rd lens element | 3.539 | 0.421 | 1.545 | 55.987 | 391.065 |
| 11'32 | | 3.447 | 0.855 | | | |
| 11'41 | 4th lens element | 58.863 | 0.416 | 1.661 | 20.412 | 35.440 |
| 11'42 | | -39.408 | 2.159 | | | |
| 11'51 | 5th lens element | -8.009 | 0.417 | 1.545 | 55.987 | -11.290 |
| 11'52 | | 27.317 | 0.407 | | | |
| 11'61 | 6th lens element | -15.348 | 0.629 | 1.661 | 20.412 | -190.508 |
| 11'62 | | -17.742 | 0.630 | | | |
| 11'71 | IR cut filter | ∞ | 0.378 | 1.517 | 64.167 | |
| 11'72 | | ∞ | 0.616 | | | |
| 11'80 | Image plane | ∞ | 0.000 | | | |

FIG. 48

| Aspherical parameters | | | | |
|---|---|---|---|---|
| Surface # | K | A2 | A4 | A6 | A8 |
| 11'11 | 0.000000E+00 | 0.000000E+00 | -2.646290E-03 | 2.636635E-03 | -9.007439E-04 |
| 11'12 | 0.000000E+00 | 0.000000E+00 | 1.494731E-02 | 3.959418E-04 | -2.844077E-03 |
| 11'21 | 0.000000E+00 | 0.000000E+00 | 1.646122E-02 | -1.461924E-03 | -3.849533E-03 |
| 11'22 | 0.000000E+00 | 0.000000E+00 | -1.112109E-02 | 3.284134E-04 | 6.684266E-03 |
| 11'31 | 0.000000E+00 | 0.000000E+00 | -5.663357E-02 | 4.720767E-03 | 4.715681E-03 |
| 11'32 | 0.000000E+00 | 0.000000E+00 | -4.522794E-02 | 2.271051E-02 | -1.819128E-02 |
| 11'41 | 0.000000E+00 | 0.000000E+00 | -5.172439E-03 | -1.002364E-02 | 1.398846E-02 |
| 11'42 | 0.000000E+00 | 0.000000E+00 | -6.345173E-03 | 5.807285E-03 | -2.773575E-03 |
| 11'51 | 0.000000E+00 | 0.000000E+00 | -1.840796E-02 | -1.222158E-03 | 2.378715E-04 |
| 11'52 | 0.000000E+00 | 0.000000E+00 | -4.435444E-03 | -3.123126E-03 | 8.644072E-04 |
| 11'61 | 0.000000E+00 | 0.000000E+00 | -1.180462E-02 | 2.625547E-03 | -2.149164E-04 |
| 11'62 | 0.000000E+00 | 0.000000E+00 | -2.172235E-02 | 3.887843E-03 | -3.444537E-04 |
| Surface # | A10 | A12 | A14 | A16 | |
| 11'11 | 1.776899E-04 | -1.031660E-05 | 2.241591E-08 | 0.000000E+00 | |
| 11'12 | 1.185803E-03 | -1.527725E-04 | -5.747725E-07 | 0.000000E+00 | |
| 11'21 | 3.588953E-03 | -1.310448E-03 | 2.440201E-04 | -2.015343E-05 | |
| 11'22 | -3.629610E-03 | 2.055147E-03 | -6.367485E-04 | 9.286095E-05 | |
| 11'31 | 5.015878E-03 | -4.670858E-03 | 1.434069E-03 | -1.593413E-04 | |
| 11'32 | 2.025847E-02 | -1.067848E-02 | 2.675068E-03 | -2.614582E-04 | |
| 11'41 | -6.629021E-03 | 1.821203E-03 | -2.814793E-04 | 1.777733E-05 | |
| 11'42 | 2.104124E-03 | -6.615411E-04 | 8.385116E-05 | -3.422344E-06 | |
| 11'51 | 2.317211E-05 | -6.512029E-06 | 4.513672E-07 | 1.182538E-07 | |
| 11'52 | -1.076680E-04 | 8.135504E-06 | -3.235179E-07 | 1.381911E-08 | |
| 11'61 | 1.187022E-05 | -6.297353E-07 | -5.322331E-08 | -4.607059E-09 | |
| 11'62 | 2.069675E-05 | -7.867134E-07 | -8.200519E-09 | -8.599656E-09 | |

FIG. 49

| Embodiment | 1st | 2nd | 3rd | 4th | 5th | 6th | 7th | 8th | 9th | 10th | 11th |
|---|---|---|---|---|---|---|---|---|---|---|---|
| EFL | 5.484 | 5.158 | 5.598 | 5.399 | 5.371 | 5.336 | 5.419 | 5.579 | 5.399 | 5.084 | 9.821 |
| T1 | 0.929 | 0.852 | 0.747 | 0.589 | 0.566 | 0.609 | 0.655 | 0.639 | 1.175 | 0.568 | 1.266 |
| G12 | 0.048 | 0.048 | 0.058 | 0.048 | 0.044 | 0.154 | 0.049 | 0.076 | 0.054 | 0.060 | 0.116 |
| T2 | 0.210 | 0.210 | 0.222 | 0.288 | 0.210 | 0.210 | 0.210 | 0.231 | 0.209 | 0.214 | 0.374 |
| G23 | 0.144 | 0.111 | 0.177 | 0.110 | 0.091 | 0.258 | 0.101 | 0.205 | 0.105 | 0.154 | 0.315 |
| T3 | 0.210 | 0.436 | 0.222 | 0.357 | 0.210 | 0.210 | 0.210 | 0.262 | 0.209 | 0.214 | 0.421 |
| G34 | 0.637 | 0.528 | 0.397 | 0.239 | 0.611 | 0.342 | 0.361 | 0.535 | 0.176 | 0.964 | 0.855 |
| T4 | 0.289 | 0.346 | 0.226 | 0.719 | 0.244 | 0.328 | 0.377 | 0.347 | 0.227 | 0.229 | 0.416 |
| G45 | 0.376 | 0.361 | 1.411 | 0.658 | 1.469 | 1.187 | 0.942 | 0.386 | 1.395 | 0.655 | 2.159 |
| T5 | 0.208 | 0.210 | 0.210 | 1.214 | 0.210 | 0.215 | 0.893 | 0.509 | 0.209 | 0.228 | 0.417 |
| G56 | 0.994 | 0.983 | 0.045 | 0.045 | 0.659 | 0.197 | 0.309 | 0.422 | 0.045 | 0.130 | 0.407 |
| T6 | 0.209 | 0.210 | 0.259 | 0.472 | 0.210 | 0.645 | 0.385 | 0.617 | 0.476 | 0.632 | 0.629 |
| G6D | 0.350 | 0.350 | 0.350 | 0.350 | 0.350 | 0.350 | 0.350 | 0.350 | 0.350 | 0.350 | 0.630 |
| TF | 0.210 | 0.210 | 0.210 | 0.210 | 0.210 | 0.210 | 0.210 | 0.210 | 0.210 | 0.210 | 0.378 |
| GFP | 0.320 | 0.177 | 0.610 | 0.100 | 0.100 | 0.100 | 0.267 | 0.530 | 0.286 | 0.230 | 0.616 |
| BFL | 0.880 | 0.737 | 1.170 | 0.660 | 0.660 | 0.660 | 0.827 | 1.090 | 0.846 | 0.790 | 1.624 |
| ALT | 2.054 | 2.263 | 1.886 | 3.639 | 1.649 | 2.218 | 2.730 | 2.604 | 2.506 | 2.077 | 3.524 |
| AAG | 2.199 | 2.031 | 2.089 | 1.100 | 2.875 | 2.138 | 1.762 | 1.623 | 1.775 | 1.963 | 3.852 |
| TL | 4.253 | 4.295 | 3.975 | 4.739 | 4.524 | 4.355 | 4.492 | 4.228 | 4.281 | 4.040 | 7.377 |
| TTL | 5.133 | 5.031 | 5.145 | 5.399 | 5.184 | 5.015 | 5.319 | 5.318 | 5.127 | 4.830 | 9.000 |
| EFL/TTL | 1.068 | 1.025 | 1.088 | 1.000 | 1.036 | 1.064 | 1.019 | 1.049 | 1.053 | 1.053 | 1.091 |
| (T1+T2+G34+G56)/G45 | 7.360 | 7.118 | 1.000 | 1.763 | 1.393 | 1.144 | 1.628 | 4.737 | 1.151 | 2.865 | 1.344 |
| (T1+T3+G34+G56)/G45 | 7.360 | 7.743 | 1.000 | 1.869 | 1.393 | 1.144 | 1.628 | 4.817 | 1.151 | 2.863 | 1.366 |
| (T1+T4+G34+G56)/G45 | 7.571 | 7.495 | 1.003 | 2.419 | 1.416 | 1.244 | 1.806 | 5.037 | 1.164 | 2.873 | 1.364 |
| (T2+G34+T5+G56+T6)/G45 | 6.000 | 5.923 | 0.803 | 3.429 | 1.293 | 1.355 | 2.289 | 6.000 | 0.800 | 3.309 | 1.243 |
| (T3+G34+T5+G56+T6)/G45 | 6.000 | 6.548 | 0.803 | 3.535 | 1.293 | 1.355 | 2.289 | 6.080 | 0.800 | 3.308 | 1.265 |
| (T4+G34+T5+G56+T6)/G45 | 6.212 | 6.300 | 0.806 | 4.085 | 1.316 | 1.455 | 2.467 | 6.300 | 0.813 | 3.318 | 1.262 |
| ALT/(T1+G12+G23) | 1.834 | 2.241 | 1.920 | 4.873 | 2.349 | 2.172 | 3.390 | 2.832 | 1.878 | 2.653 | 2.076 |
| AAG/(T1+G12+G23) | 1.962 | 2.011 | 2.127 | 1.472 | 4.096 | 2.093 | 2.188 | 1.765 | 1.330 | 2.508 | 2.270 |
| BFL/(G12+G23) | 4.591 | 4.651 | 4.972 | 4.193 | 4.860 | 1.603 | 5.500 | 3.885 | 5.320 | 3.689 | 3.764 |
| G34/(G12+G23) | 3.322 | 3.334 | 1.688 | 1.519 | 4.500 | 0.831 | 2.399 | 1.906 | 1.109 | 4.500 | 1.982 |
| (T5+G56)/(G12+G23) | 6.272 | 7.535 | 1.081 | 8.000 | 6.401 | 1.000 | 7.996 | 3.321 | 1.597 | 1.670 | 1.911 |
| T6/(G12+G23) | 1.089 | 1.325 | 1.102 | 3.000 | 1.546 | 1.567 | 2.558 | 2.198 | 2.994 | 2.952 | 1.459 |
| EFL/(T1+G45) | 4.202 | 4.251 | 2.594 | 4.327 | 2.639 | 2.970 | 3.393 | 5.445 | 2.100 | 4.155 | 2.868 |
| TL/(T1+G45) | 3.259 | 3.540 | 1.842 | 3.798 | 2.223 | 2.424 | 2.812 | 4.126 | 1.666 | 3.301 | 2.154 |

FIG. 50 ptical IMAGING LENS

CROSS-REFERENCE TO RELATED APPLICATIONS

This application claims priority to P.R.C. Patent Application No. 201710407700.6, titled "Optical Imaging Lens", filed at the State Intellectual Property Office of the People's Republic of China (SIPO), on Jun. 2, 2017, which is incorporated by reference herein in its entirety.

TECHNICAL FIELD

The present disclosure relates to an optical imaging lens, and particularly, to an optical imaging lens having six lens elements.

BACKGROUND

Because technology for mobile electronic devices is improving constantly, optical imaging lenses are developed diversely. As a result, applications of mobile electronic devices are not only limited to taking pictures or videos and further have telephoto photography function to satisfy consumers' demands. Consumer demand for imaging quality have increased with continued improvements to optical imaging lenses. With respect to a conventional telephoto lens, its length is generally larger than 50 mm, and its Fno is 4 or more than 4. Thus, a conventional telephoto lens generally cannot satisfy consumer demands.

To preserve good imaging quality, the materials of the optical imaging lens and manufacturing yield should be considered when reducing the size of the optical imaging lens. In this manner, there is a desirable objective for improving an optical imaging lens having six lens when maintaining a good imaging quality and yield.

SUMMARY

The present disclosure provides for an optical imaging lens. As disclosed herein, by designing the convex and/or concave surfaces of the six lens elements in particular manners, the imaging quality and yield of an optical imaging lens may be increased.

In the present disclosure, parameters used herein may be chosen from but not limited to parameters listed below:

| Parameter | Definition |
|---|---|
| T1 | A central thickness of a first lens element along an optical axis |
| G12 | An air gap between a first lens element and a second lens element along an optical axis |
| T2 | A central thickness of a second lens element along an optical axis |
| G23 | An air gap between a second lens element and a third lens element along an optical axis |
| T3 | A central thickness of a third lens element along an optical axis |
| G34 | An air gap between a third lens element and a fourth lens element along an optical axis |
| T4 | A central thickness of a fourth lens element along an optical axis |
| G45 | An air gap between a fourth lens element and a fifth lens element along an optical axis |
| T5 | A central thickness of a fifth lens element along an optical axis |
| G56 | An air gap between a fifth lens element and a sixth lens element along an optical axis |

| Parameter | Definition |
|---|---|
| T6 | A central thickness of a sixth lens element along an optical axis |
| G6F | An air gap between a sixth lens element and a filtering unit along an optical axis |
| TF | A central thickness of a filtering unit along an optical axis |
| GFP | An air gap between a filtering unit and an image plane along an optical axis |
| f1 | A focal length of a first lens element |
| f2 | A focal length of a second lens element |
| f3 | A focal length of a third lens element |
| f4 | A focal length of a fourth lens element |
| f5 | A focal length of a fifth lens element |
| f6 | A focal length of a sixth lens element |
| n1 | A refracting index of a first lens element |
| n2 | A refracting index of a second lens element |
| n3 | A refracting index of a third lens element |
| n4 | A refracting index of a fourth lens element |
| n5 | A refracting index of a fifth lens element |
| n6 | A refracting index of a sixth lens element |
| v1 | An Abbe number of a first lens element |
| v2 | An Abbe number of a second lens element |
| v3 | An Abbe number of a third lens element |
| v4 | An Abbe number of a fourth lens element |
| v5 | An Abbe number of a fifth lens element |
| v6 | An Abbe number of a sixth lens element |
| HFOV | Half Field of View of an optical imaging lens |
| Fno | F-number of an optical imaging lens |
| EFL | An effective focal length of an optical imaging lens |
| TTL | A distance from an object-side surface of a first lens element to an image plane along an optical axis |
| ALT | A sum of a central thicknesses from a first lens element to a sixth lens element |
| AAG | A sum of all air gaps from a first lens element to a sixth lens element along an optical axis |
| BFL | A back focal length of an optical imaging lens/A distance from an image-side surface of a sixth lens element to an image plane along an optical axis |
| TL | A distance from an object-side surface of a first lens element to an image-side surface of a sixth lens element along an optical axis |

According to one embodiment of the present disclosure, an optical imaging lens may comprise sequentially from an object side to an image side along an optical axis, a first lens element, a second lens element, a third lens element, a fourth lens element, a fifth lens element, and a sixth lens element. Each of the first, second, third, fourth, fifth, and sixth lens elements may have varying refracting power in some embodiments. Additionally, each of the first, second, third, fourth, fifth, and sixth lens elements may comprise an object-side surface facing toward the object side, an image-side surface facing toward the image side, and a central thickness defined along an optical axis. Moreover, the first lens element may have positive refracting power; the object-side surface or the image-side surface of the second lens element may be an aspherical surface; the image-side surface of the third lens element may comprise a concave portion in a vicinity of a periphery of the third lens element; the image-side surface of the fourth lens element may comprise a convex portion in a vicinity of a periphery of the fourth lens element; the fifth lens element may have negative refracting power; the object-side surface of the sixth lens element may comprise a concave portion in a vicinity of the optical axis; a focal length of the first lens element is represented by f1, a focal length of the second lens element is represented by f2, a distance between the object-side surface of the first lens element and an image plane along the optical axis is represented by TTL, an effective focal length of the optical imaging lens is represented by EFL, and the optical imaging lens satisfies inequalities(1)~(4):

$$1.5 \times |f1| > |f2| \qquad \text{inequality(1);}$$

$$f1 > TTL/2 \qquad \text{inequality(2);}$$

$$EFL/TTL \geq 1.000 \qquad \text{inequality(3); and}$$

$$TTL \leq 15 \text{ mm} \qquad \text{inequality(4).}$$

According to one embodiment of the present disclosure, an optical imaging lens may comprise sequentially from an object side to an image side along an optical axis, a first lens element, a second lens element, a third lens element, a fourth lens element, a fifth lens element, and a sixth lens element. Each of the first, second, third, fourth, fifth, and sixth lens elements may have varying refracting power in some embodiments. Additionally, each of the first, second, third, fourth, fifth, and sixth lens elements may comprise an object-side surface facing toward the object side, an image-side surface facing toward the image side, and a central thickness defined along an optical axis. Moreover, the first lens element may have positive refracting power; the object-side surface or the image-side surface of the second lens element may be an aspherical surface; the image-side surface of the fourth lens element may comprise a convex portion in a vicinity of a periphery of the fourth lens element; the fifth lens element may have negative refracting power and the image-side surface of the fifth lens element may comprise a convex portion in a vicinity of a periphery of the fifth lens element; the object-side surface of the sixth lens element may comprise a concave portion in a vicinity of the optical axis; a focal length of the first lens element is represented by f1, a focal length of the second lens element is represented by f2, a distance between the object-side surface of the first lens element and an image plane along the optical axis is represented by TTL, an effective focal length of the optical imaging lens is represented by EFL, and the optical imaging lens satisfies inequalities(1)~(3) and (5):

$$1.5 \times |f1| > |f2| \qquad \text{inequality(1);}$$

$$f1 > TTL/2 \qquad \text{inequality(2);}$$

$$EFL/TTL \geq 1.000 \qquad \text{inequality(3); and}$$

$$TTL \leq 9 \text{ mm} \qquad \text{inequality(5).}$$

One embodiment of the optical imaging lens may satisfy any one of inequalities as follows:

$$v1 > v2 + v4 \qquad \text{inequality (6);}$$

$$(T1+T2+G34+G56)/G45 \leq 8.000 \qquad \text{inequality (7);}$$

$$(T2+G34+T5+G56+T6)/G45 \leq 6.000 \qquad \text{inequality (8);}$$

$$ALT/(T1+G12+G23) \leq 5.000 \qquad \text{inequality (9);}$$

$$G34/(G12+G23) \leq 4.500 \qquad \text{inequality (10);}$$

$$EFL/(T1+G45) \leq 6.000 \qquad \text{inequality (11);}$$

$$v1 > v2 + v6 \qquad \text{inequality (12);}$$

$$(T1+T3+G34+G56)/G45 \leq 7.800 \qquad \text{inequality (13);}$$

$$(T3+G34+T5+G56+T6)/G45 \leq 6.600 \qquad \text{inequality (14);}$$

$$AAG/(T1+G12+G23) \leq 4.500 \qquad \text{inequality (15);}$$

$$(T5+G56)/(G12+G23) \leq 8.000 \qquad \text{inequality (16);}$$

$$TL/(T1+G45) \leq 5.000 \qquad \text{inequality (17);}$$

$$v1 > v4 + v6 \qquad \text{inequality (18);}$$

$$(T1+T4+G34+G56)/G45 \leq 8.000 \qquad \text{inequality (19);}$$

$$(T4+G34+T5+G56+T6)/G45 \leq 6.300 \qquad \text{inequality (20);}$$

$$BFL/(G12+G23) \leq 5.500 \qquad \text{inequality (21); and}$$

$$T6/(G12+G23) \leq 3.000 \qquad \text{inequality (22)}$$

BRIEF DESCRIPTION OF THE DRAWINGS

Exemplary embodiments will be more readily understood from the following detailed description when read in conjunction with the appended drawing, in which:

FIG. 1 depicts a cross-sectional view of one single lens element according to one embodiment of the present disclosure;

FIG. 2 depicts a schematic view of a relation between a surface shape and an optical focus of a lens element;

FIG. 8 depicts a table of optical data for each lens element of an optical imaging lens of a first embodiment of the present disclosure;

FIG. 9 depicts a table of aspherical data of a first embodiment of an optical imaging lens according to the present disclosure;

FIG. 12 depicts a table of optical data for each lens element of an optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of an optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of an eighth embodiment of an optical imaging lens according to the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of a tenth embodiment of an optical imaging lens according to the present disclosure;

FIG. 45 depicts a table of aspherical data of a tenth embodiment of the optical imaging lens according to the present disclosure;

FIG. 48 depicts a table of optical data for each lens element of an eleventh embodiment of an optical imaging lens according to the present disclosure;

FIG. 49 depicts a table of aspherical data of an eleventh embodiment of the optical imaging lens according to the present disclosure;

FIG. 50 is a value table reflecting determined values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) as determined in specific example embodiments.

DETAILED DESCRIPTION

Figure 5:
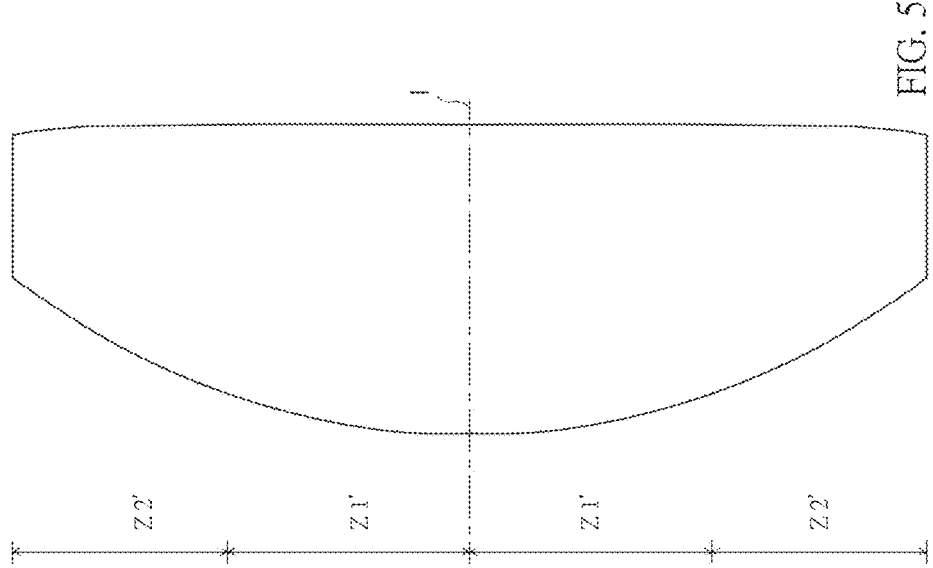
FIG. 5 depicts a schematic view of a third example of a surface shape and an effective radius of a lens element.

For a more complete understanding of the present disclosure and its advantages, reference is now made to the following description taken in conjunction with the accompanying drawings, in which like reference numbers indicate like features. Persons having ordinary skill in the art will understand other variations for implementing example embodiments, including those described herein. The drawings are not limited to a specific scale. In the drawings, similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on," and the terms "a," "an," and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

In the present disclosure, the description "a lens element having positive refracting power (or negative refracting power)" may mean that a paraxial refracting power of the lens element in Gaussian optics is positive (or negative). The description "an object-side (or image-side) surface of a lens element" may include a specific region of that surface of the lens element where imaging rays are capable of passing through that region, namely the clear aperture of the surface. The aforementioned imaging rays can be classified into two types, namely a chief ray Lc and a marginal ray Lm. Taking a lens element depicted in FIG. 1 as an example, the lens element may be rotationally symmetric, where the optical axis I is the axis of symmetry. The region A of the lens element may be defined as "a part in a vicinity of the optical axis," and the region C of the lens element may be defined as "a part in a vicinity of a periphery of the lens element." Besides, the lens element may also have an extending part E extended radially and outwardly from the region C, namely the part outside of the clear aperture of the lens element. The extending part E may be used for physically assembling the lens element into an optical imaging lens system. Under normal circumstances, the imaging rays may not pass through the extending part E because those imaging rays may only pass through the clear aperture. The structures and shapes of the aforementioned extending part E are only examples for technical explanation, the structures and shapes of lens elements should not be limited to these examples. Note that the extending parts of the lens element surfaces depicted in the following embodiments may be partially omitted.

The following criteria are provided for determining the shapes and the parts of lens element surfaces set forth in the present disclosure. These criteria mainly determine the boundaries of parts under various circumstances including the part in a vicinity of the optical axis, the part in a vicinity of a periphery of a lens element surface, and/or other types of lens element surfaces such as those having multiple parts.

FIG. 1 depicts a radial cross-sectional view of a lens element. Before determining boundaries of those aforementioned portions, two referential points should be defined first, namely a central point CP and a transition point. The central point of a surface of a lens element may be a point of intersection of that surface and the optical axis I. The transition point may be a point on a surface of a lens element, where the tangent line of that point is perpendicular to the optical axis. Additionally, if multiple transition points appear on one single surface, then these transition points may be sequentially named along the radial direction of the surface with numbers starting from the first transition point. For instance, a first transition point TP1 (e.g., a transition point closest one to the optical axis), a second transition point, and a Nth transition point (e.g., a transition point farthest away from the optical axis within the scope of the clear aperture of the surface). The portion of a surface of the lens element between the central point CP and the first transition point TP1 may be defined as the portion in a vicinity of the optical axis. The portion located radially outside of the Nth transition point (but still within the scope of the clear aperture) may be defined as the portion in a vicinity of a periphery of the lens element. In some embodiments, there may be other portions existing between the portion in a vicinity of the optical axis and the portion in a vicinity of a periphery of the lens element; the numbers of portions may depend on the numbers of the transition point(s). In addition, the radius of the clear aperture (or a so-called effective radius) of a surface may be defined as the radial distance from the optical axis I to a point of intersection of the marginal ray Lm and the surface of the lens element.

Referring to FIG. 2, determining whether the shape of a portion is convex or concave may depend on whether a collimated ray L passing through that portion converges or diverges. That is, while applying a collimated ray L to a portion to be determined in terms of shape, the collimated ray L passing through that portion may be bended and the ray itself or its extension line EL may eventually meet the optical axis I. The shape of that portion may be determined by whether the ray or its extension line EL meets (intersects) the optical axis I (focal point) at the object-side A1 or image-side A2. For instance, if the ray itself intersects the optical axis I at the image side A2 of the lens element after passing through a portion, (i.e., the focal point of this ray is at the image side A2 (see point R in FIG. 2)), the portion may be determined as having a convex shape. On the contrary, if the ray diverges after passing through a portion, the extension line of the ray intersects the optical axis at the object side of the lens element, (i.e., the focal point of the ray is at the object side (see point M in FIG. 2)), that portion may be determined as having a concave shape. Therefore, referring to FIG. 2, the portion between the central point CP and the first transition point TP1 may have a convex shape, the portion located radially outside of the first transition point may have a concave shape, and the first transition point may be the point where the portion having a convex shape changes to the portion having a concave shape, namely the border of two adjacent portions. Alternatively, there may be another method to determine whether a portion in a vicinity of the optical axis may have a convex or concave shape by referring to the sign of an "R" value, which may be the (paraxial) radius of curvature of a lens surface. The R value may be used in conventional optical design software such as Zemax and CodeV. The R value usually appears in the lens data sheet in the software. For an object-side surface, positive R may mean that the object-side surface is convex, and negative R may mean that the object-side surface is concave. Conversely, for an image-side surface, positive R may mean that the image-side surface is concave, and negative R may mean that the image-side surface is convex. The result found by using this method should be consistent with the result found using the other way mentioned above, which may determine surface shapes by referring to whether the focal point of a collimated ray is at the object side or the image side.

Referring to a case where a transition point is absent, a portion in a vicinity of an optical axis may be defined as the portion between 0-50% of an effective radius (radius of the clear aperture) of a surface, whereas a portion in a vicinity of a periphery of the lens element may be defined as the portion between 50-100% of the effective radius (radius of the clear aperture) of the surface.

Figure 3:
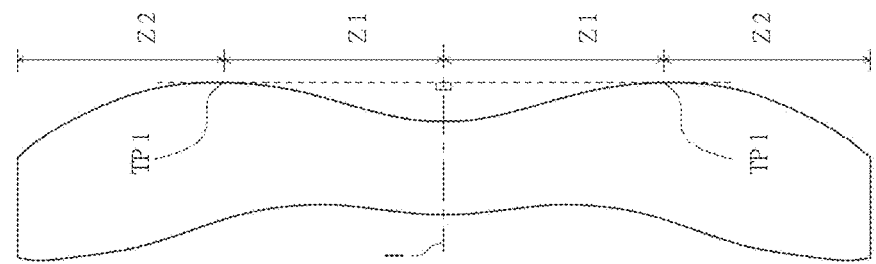
FIG. 3 depicts a schematic view of a first example of a surface shape and an effective radius of a lens element.

FIG. 3 illustrates a lens element having only one transition point, namely a first transition point within a clear aperture of an image-side surface of the lens element. Portion I may Z1 be a portion in a vicinity of the optical axis, and portion II Z2 may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion (i.e., the shape of the portion in a vicinity of a periphery of the lens element may be different from the shape of the portion in a vicinity of the optical axis); the portion in a vicinity of a periphery of the lens element may have a convex shape.

Figure 4:
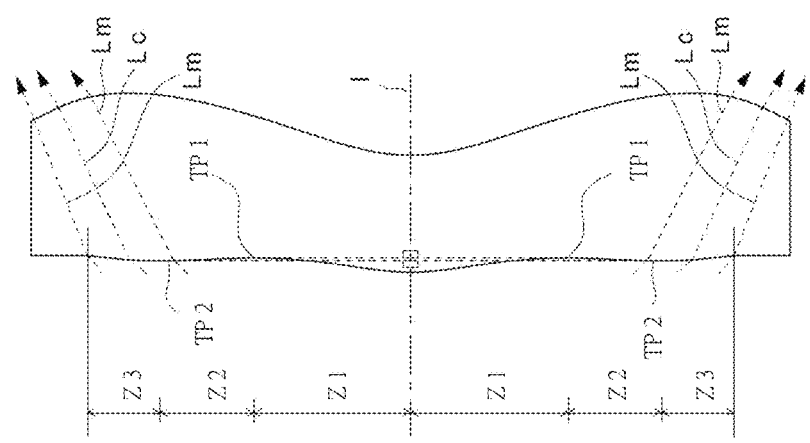
FIG. 4 depicts a schematic view of a second example of a surface shape and an effective radius of a lens element.

FIG. 4 illustrates a lens element having a first transition point and a second transition point TP2 on an object-side surface (within the clear aperture) of the lens element. Here, portion I Z1 may be the portion in a vicinity of the optical axis, and portion III Z3 may be the portion in a vicinity of a periphery of the lens element. The portion in a vicinity of the optical axis may have a convex shape because the R value at the object-side surface of the lens element may be positive. The portion in a vicinity of a periphery of the lens element (portion III) may have a convex shape. What is more, there may be another portion having a concave shape existing between the first and second transition point (portion II).

FIG. 5 illustrates a lens element having no transition point on the object-side surface of the lens element. In this case, the portion between 0-50% of the effective radius (radius of the clear aperture) Z1' may be determined as the portion in a vicinity of the optical axis, and the portion between 50-100% of the effective radius Z2' may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

Figure 6:
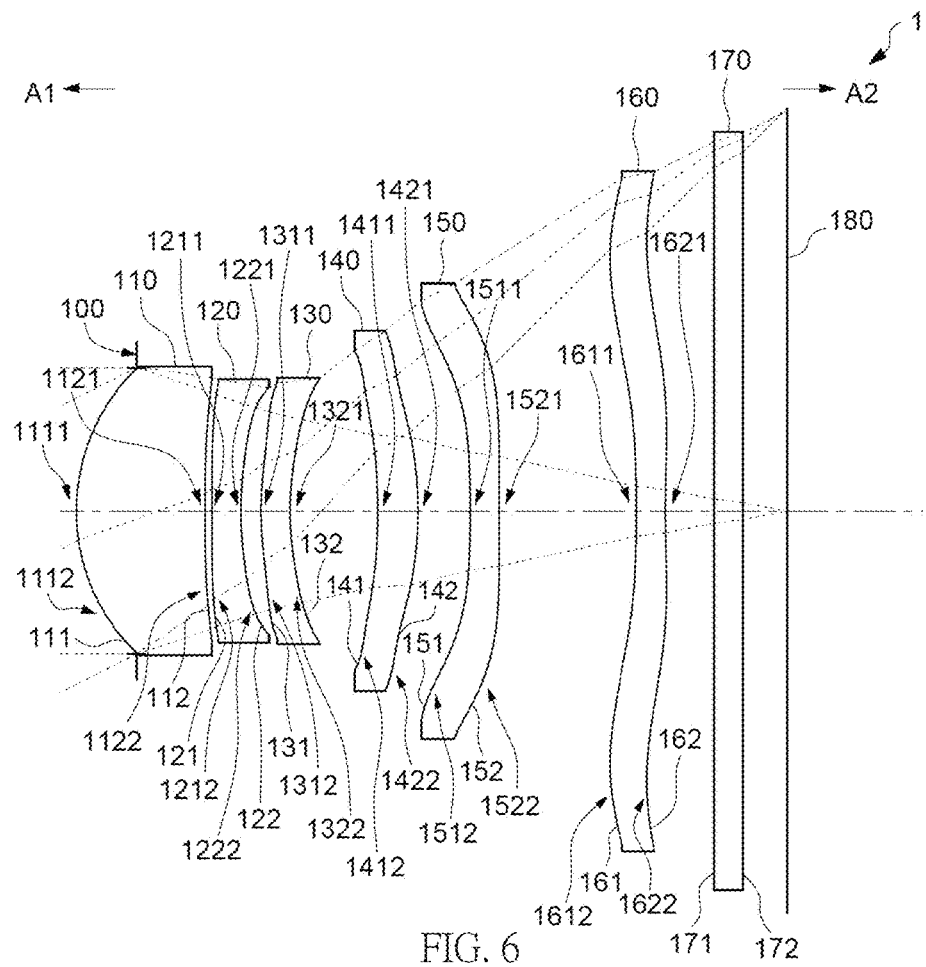
FIG. 6 depicts a cross-sectional view of a first embodiment of an optical imaging lens having six lens elements according to one embodiment of the present disclosure.
Figure 7:
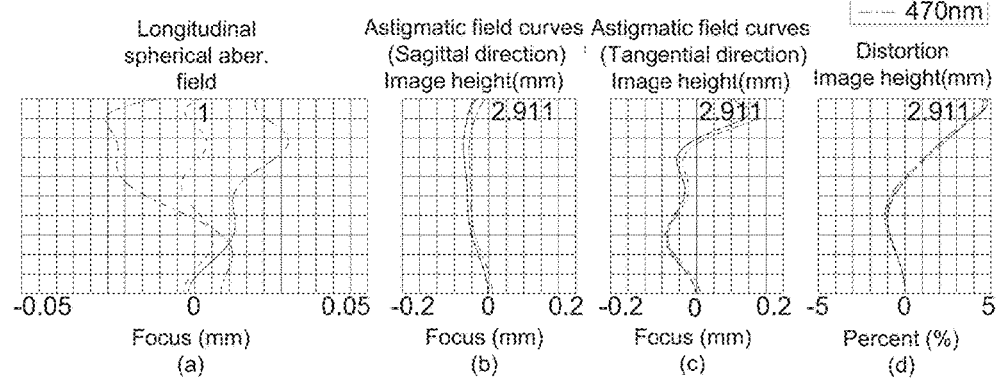
FIG. 7 depicts a chart of longitudinal spherical aberration and other kinds of optical aberrations of a first embodiment of an optical imaging lens according to the present disclosure.

Several exemplary embodiments and associated optical data will now be provided to illustrate non-limiting examples of optical imaging lens systems having good optical characteristics while increasing the field of view. Reference is now made to FIGS. 6-9. FIG. 6 illustrates an example cross-sectional view of an optical imaging lens 1 having six lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, a fifth lens element 150 and a sixth lens element 160. A filtering unit 170 and an image plane 180 of an image sensor (not shown) may be positioned at the image side A2 of the optical imaging lens 1. Each of the first, second, third, fourth, fifth and sixth lens elements 110, 120, 130, 140, 150, 160 and the filtering unit 170 may comprise an object-side surface 111/121/131/141/151/161/171 facing toward the object side A1 and an image-side surface 112/122/132/142/152/162/172 facing toward the image side A2. The example embodiment of the filtering unit 170 illustrated may be an IR cut filter (infrared cut filter) positioned between the sixth lens element 160 and the image plane 180. The filtering unit 170 may selectively absorb light passing optical imaging lens 1 that has a specific wavelength. For example, if IR light is absorbed, IR light which is not seen by human eyes may be prohibited from producing an image on the image plane 180.

Exemplary embodiments of each lens element of the optical imaging lens 1 will now be described with reference to the drawings. The lens elements of the optical imaging lens 1 may be constructed using plastic materials in this embodiment.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a concave portion 1122 in a vicinity of the periphery of the first lens element 110.

An example embodiment of the second lens element 120 may have negative refracting power. The object-side surface 121 may comprise a concave portion 1211 in a vicinity of the optical axis and a convex portion 1212 in a vicinity of a periphery of the second lens element 120. The image-side surface 122 may comprise a concave portion 1221 in a vicinity of the optical axis and a concave portion 1222 in a vicinity of the periphery of the second lens element 120.

An example embodiment of the third lens element 130 may have negative refracting power. The object-side surface 131 may comprise a convex portion 1311 in a vicinity of the optical axis and a convex portion 1312 in a vicinity of a periphery of the third lens element 130. The image-side surface 132 may comprise a concave portion 1321 in a vicinity of the optical axis and a concave portion 1322 in a vicinity of the periphery of the third lens element 130.

An example embodiment of the fourth lens element 140 may have positive refracting power. The object-side surface 141 may comprise a concave portion 1411 in a vicinity of the optical axis and a concave portion 1412 in a vicinity of a periphery of the fourth lens element 140. The image-side surface 142 may comprise a convex portion 1421 in a vicinity of the optical axis and a convex portion 1422 in a vicinity of the periphery of the fourth lens element 140.

An example embodiment of the fifth lens element 150 may have negative refracting power. The object-side surface 151 may comprise a concave portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of the periphery of the fifth lens element 150.

An example embodiment of the sixth lens element 160 may have negative refracting power. The object-side surface 161 may comprise a concave portion 1611 in a vicinity of the optical axis and a convex portion 1612 in a vicinity of a periphery of the sixth lens element 160. The image-side surface 162 may comprise a concave portion 1621 in a vicinity of the optical axis and a concave portion 1622 in a vicinity of the periphery of the sixth lens element 160.

The aspherical surfaces including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, and the object-side surface 161 and the image-side surface 162 of the sixth lens element 160 may all be defined by the following aspherical formula (1):

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad \text{formula (1)}$$

wherein,

R represents the radius of curvature of the surface of the lens element;

Z represents the depth of the aspherical surface (i.e., the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_i$ represents an aspherical coefficient of $i^{th}$ level.

Values of each aspherical parameter are shown in FIG. 9.

FIG. 7(a) shows the longitudinal spherical aberration, wherein the horizontal axis of FIG. 7(a) defines the focus, and wherein the vertical axis of FIG. 7(a) defines the field of view. FIG. 7(b) shows the astigmatism aberration in the sagittal direction, wherein the horizontal axis of FIG. 7(b) defines the focus, and wherein the vertical axis of FIG. 7(b) defines the image height. FIG. 7(c) shows the astigmatism aberration in the tangential direction, wherein the horizontal axis of FIG. 7(c) defines the focus, and wherein the vertical axis of FIG. 7(c) defines the image height. FIG. 7(d) shows a variation of the distortion aberration, wherein the horizontal axis of FIG. 7(d) defines the percentage, and wherein the vertical axis of FIG. 7(d) defines the image height. The three curves with different wavelengths (470 nm, 555 nm, 650 nm) may represent that off-axis light with respect to these wavelengths may be focused around an image point. From the vertical deviation of each curve shown in FIG. 7(a), the offset of the off-axis light relative to the image point may be within about ±0.03 mm. Therefore, the first embodiment may improve the longitudinal spherical aberration with respect to different wavelengths. Referring to FIG. 7(b), the focus variation with respect to the three different wavelengths (470 nm, 555 nm, 650 nm) in the whole field may fall within about ±0.08 mm. Referring to FIG. 7(c), the focus variation with respect to the three different wavelengths (470 nm, 555 nm, 650 nm) in the whole field may fall within about ±0.16 mm. Referring to FIG. 7(d), the horizontal axis of FIG. 7(d), the variation of the distortion aberration may be within about ±5%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

The distance from the object-side surface 111 of the first lens element 110 to the image plane 180 along the optical axis (TTL) may be about 5.133 mm, Fno may be about 2.650, and HFOV may be about 26.875 degrees. When the value of Fno is smaller, the size of the aperture stop and the amounts of light entering into the optical imaging lens may be larger. In accordance with these values, the present embodiment may provide an optical imaging lens having a shortened length while maintaining more advantageous amounts of light entering into the optical imaging lens.

Figure 10:
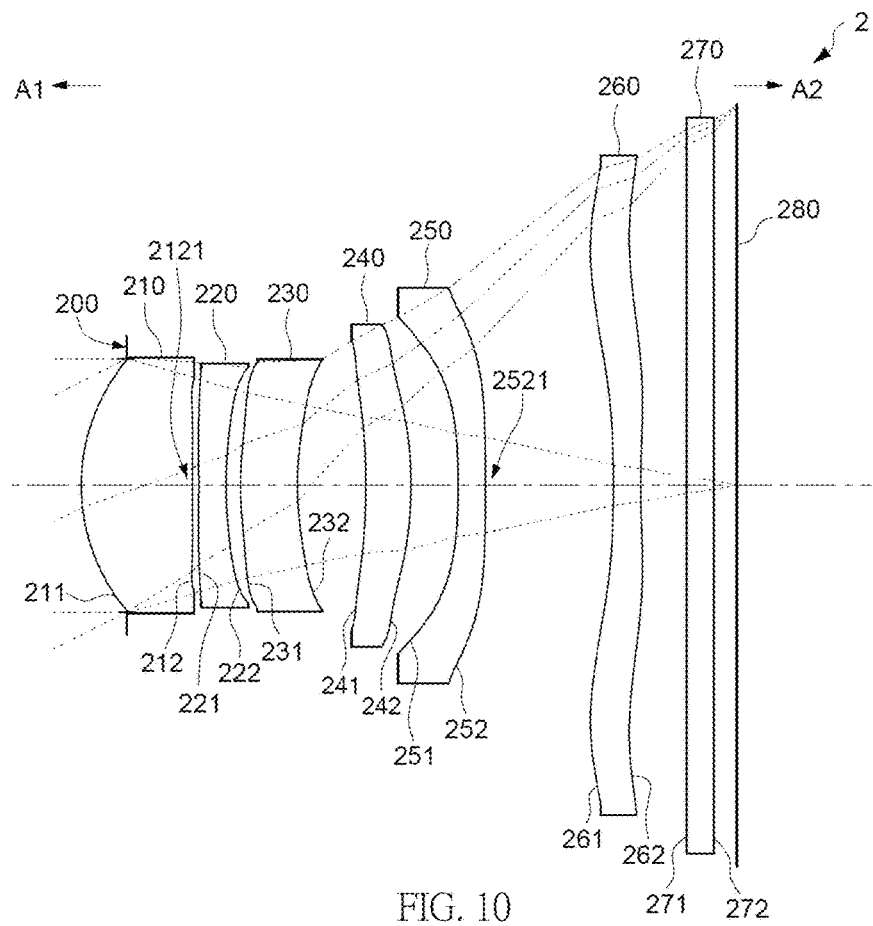
FIG. 10 depicts a cross-sectional view of a second embodiment of an optical imaging lens having six lens elements according to the present disclosure.
Figure 11:
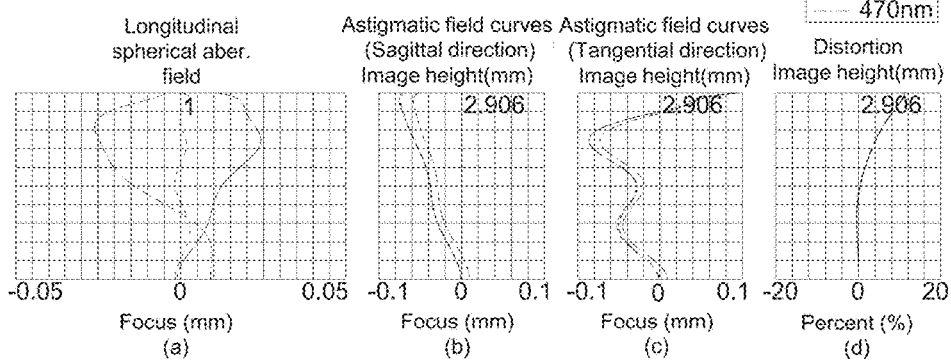
FIG. 11 depicts a chart of longitudinal spherical aberration and other kinds of optical aberrations of a second embodiment of an optical imaging lens according to one embodiment of the present disclosure.

Reference is now made to FIGS. 10-13. FIG. 10 illustrates an example cross-sectional view of an optical imaging lens 2 having six lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment may be similar to those in the first embodiment for the similar elements, but here the reference numbers may be initialed with 2; for example, reference number 231 may label the object-side surface of the third lens element 230, reference number 232 may label the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, a fifth lens element 250 and a sixth lens element 260.

The arrangements of convex or concave surface structures including the object-side surfaces 211, 221, 231, 241, 251, 261 and the image-side surfaces 222, 232, 242, 262 may be generally similar to the optical imaging lens 1, but the differences between the optical imaging lens 1 and the optical imaging lens 2 may include the convex or concave surface structures of the image-side surfaces 212 and 252. Additional differences may include a radius of curvature, refracting power, a thickness, an aspherical data, and an effective focal length of each lens element. More specifically, the image-side surface 212 of the first lens element 210 may comprise a convex portion 2121 in a vicinity of the optical axis, the third lens element 230 has positive refracting power, and the image-side surface 252 of the fifth lens element 250 may comprise a convex portion 2521 in a vicinity of the optical axis.

Here, in the interest of clearly showing the drawings of a particular embodiment, only the surface shapes which are different from that in the first embodiment may be labeled. Please refer to FIG. 12 for the optical characteristics of each lens element in the optical imaging lens 2 of the present embodiment.

From the vertical deviation of each curve shown in FIG. 11(a), the offset of the off-axis light relative to the image point may be within about ±0.03 mm. Referring to FIG. 11(b), the focus variation with respect to the three different wavelengths (470 nm, 555 nm, 650 nm) in the whole field may fall within about ±0.16 mm. Referring to FIG. 11(c), the focus variation with respect to the three different wavelengths (470 nm, 555 nm, 650 nm) in the whole field may fall within about ±0.10 mm. Referring to FIG. 11(d), the variation of the distortion aberration of the optical imaging lens 2 may be within about ±12%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, TTL is smaller, and imaging quality may be better (the value of longitudinal spherical aberration, astigmatism aberration, or distortion aberration may be smaller). Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 14:
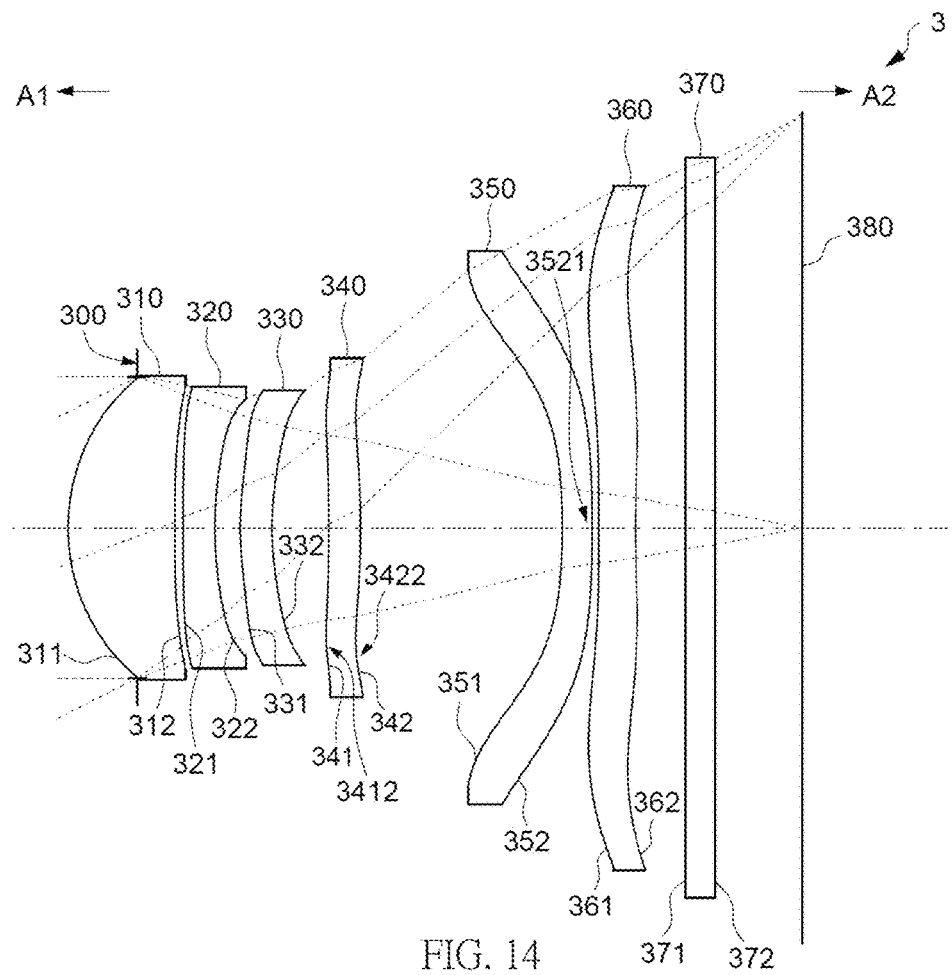
FIG. 14 depicts a cross-sectional view of a third embodiment of an optical imaging lens having six lens elements according to the present disclosure.
Figure 15:
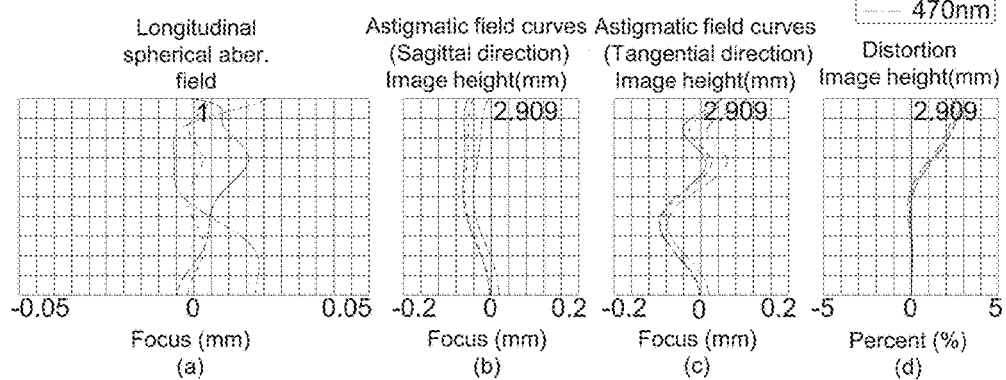
FIG. 15 depicts a chart of longitudinal spherical aberration and other kinds of optical aberrations of a third embodiment of an optical imaging lens according the present disclosure.

Reference is now made to FIGS. 14-17. FIG. 14 illustrates an example cross-sectional view of an optical imaging lens 3 having six lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment may be similar to those in the first embodiment for the similar elements, but here the reference numbers may be initialed with 3; for example, reference number 331 may label the object-side surface of the third lens element 330, reference number 332 may label the image-side surface of the third lens element 330, etc.

As shown in FIG. 14, the optical imaging lens 3 of the third example embodiment, in an order from an object side A1 to an image side A2 along an optical axis, may comprise an aperture stop 300, a first lens element 310, a second lens element 320, a third lens element 330, a fourth lens element 340, a fifth lens element 350 and a sixth lens element 360.

The arrangements of the convex or concave surface structures in the third example embodiment, including the object-side surfaces 311, 321, 331, 351, 361 and the image-side surfaces 312, 322, 332, 362 may be generally similar to the optical imaging lens 1 (FIG. 6 depicting the first example embodiment), but the differences between the optical imaging lens 1 and the optical imaging lens 3 may include the convex or concave surface structure of the object-side surface 341 and the image-side surfaces 342 and 352. Additional differences may include a radius of curvature, a thickness, aspherical data, and an effective focal length of each lens element. More specifically, the object-side surface 341 of the fourth lens element 340 may comprise a convex portion 3412 in a vicinity of a periphery of the fourth lens element 340, the image-side surface 342 of the fourth lens element 340 may comprise a concave portion 3422 in a vicinity of a periphery of the fourth lens element 340, and the image-side surface 352 of the fifth lens element 350 may comprise a convex portion 3521 in a vicinity of the optical axis.

Here, in the interest of clearly showing the drawings of a particular embodiment, only the surface shapes which are different from that in the first embodiment may be labeled. Please refer to FIG. 16 for the optical characteristics of each lens element in the optical imaging lens 3 of the third example embodiment.

From the vertical deviation of each curve shown in FIG. 15(*a*), the offset of the off-axis light relative to the image point may be within about ±0.02 mm. Referring to FIG. 15(*b*), the focus variation with respect to the three different wavelengths (470 nm, 555 nm, 650 nm) in the whole field may fall within about ±0.08 mm. Referring to FIG. 15(*c*), the focus variation with respect to the three different wavelengths (470 nm, 555 nm, 650 nm) in the whole field may fall within about ±0.12 mm. Referring to FIG. 15(*d*), the variation of the distortion aberration of the optical imaging lens 3 may be within about ±3%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, the imaging quality may be better (the value of longitudinal spherical aberration, astigmatism aberration, or distortion aberration may be smaller). Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 18:
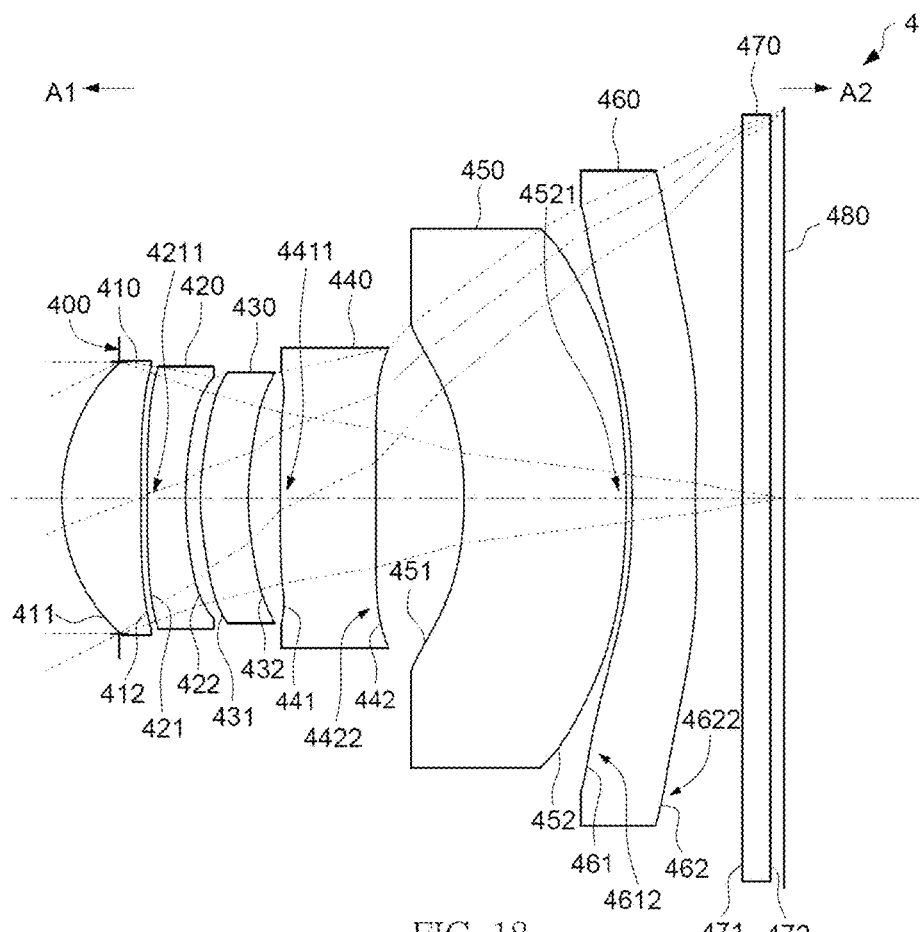
FIG. 18 depicts a cross-sectional view of a fourth embodiment of an optical imaging lens having six lens elements according to the present disclosure.
Figure 19:
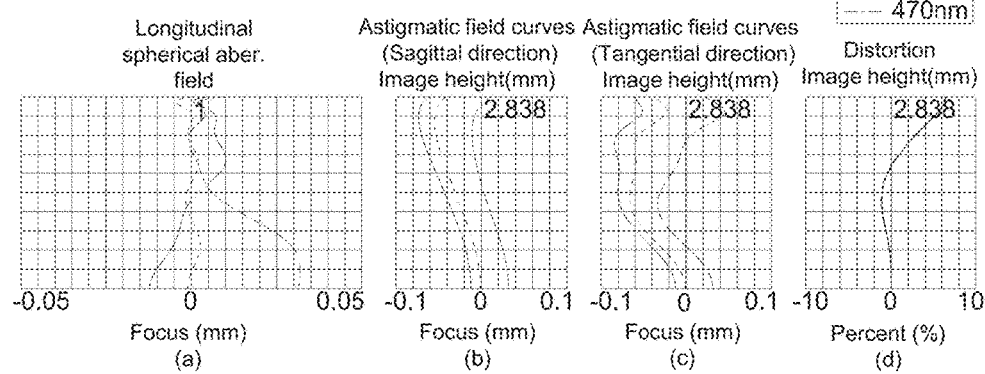
FIG. 19 depicts a chart of longitudinal spherical aberration and other kinds of optical aberrations of a fourth embodiment of an optical imaging lens according the present disclosure.

Reference is now made to FIGS. 18-21. FIG. 18 illustrates an example cross-sectional view of an optical imaging lens 4 having six lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment may be similar to those in the first example embodiment for the similar elements, but here the reference numbers may be initialed with 4; for example, reference number 431 may label the object-side surface of the third lens element 430, reference number 432 may label the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, a fifth lens element 450 and a sixth lens element 460.

The arrangements of the convex or concave surface structures, including the object-side surfaces 411, 431, 451 and the image-side surfaces 412, 422, 432 may be generally similar to the optical imaging lens 1, but the differences between the optical imaging lens 1 and the optical imaging lens 4 may include the convex or concave surface of the object-side surfaces 441 and 461 and the image-side surfaces 442, 452 and 462. Additional differences may include a radius of curvature, refracting power, a thickness, aspherical data, and an effective focal length of each lens element. More specifically, the object-side surface 421 of the second lens element 420 may comprise a convex portion 4211 in a vicinity of the optical axis, the third lens element 430 has positive refracting power, the object-side surface 441 of the fourth lens element 440 may comprise a convex portion 4411 in a vicinity of the optical axis, the image-side surface 442 of the fourth lens element 440 may comprise a concave portion 4422 in a vicinity of a periphery of the fourth lens element 440, the image-side surface 452 of the fifth lens element 450 may comprise a convex portion 4521 in a vicinity of the optical axis, the object-side surface 461 of the sixth lens element 460 may comprise a concave portion 4612 in a vicinity of a periphery of the sixth lens element 460, and the image-side surface 462 of the sixth lens element 460 may comprise a convex portion 4622 in a vicinity of a periphery of the sixth lens element 460.

Here, in the interest of clearly showing the drawings of a particular embodiment, only the surface shapes which are different from that in the first embodiment may be labeled. Please refer to FIG. 20 for the optical characteristics of each lens elements in the optical imaging lens 4 of the present embodiment.

From the vertical deviation of each curve shown in FIG. 19(*a*), the offset of the off-axis light relative to the image point may be within about ±0.035 mm. Referring to FIG. 19(*b*), the focus variation with respect to the three different wavelengths (470 nm, 555 nm, 650 nm) in the whole field may fall within about ±0.08 mm. Referring to FIG. 19(*c*), the focus variation with respect to the three different wavelengths (470 nm, 555 nm, 650 nm) in the whole field may fall within about ±0.1 mm. Referring to FIG. 19(*d*), the variation of the distortion aberration of the optical imaging lens 4 may be within about ±8%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, the imaging quality may be better (the value of longitudinal spherical aberration, astigmatism aberration, or distortion aberration may be smaller). Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 22:
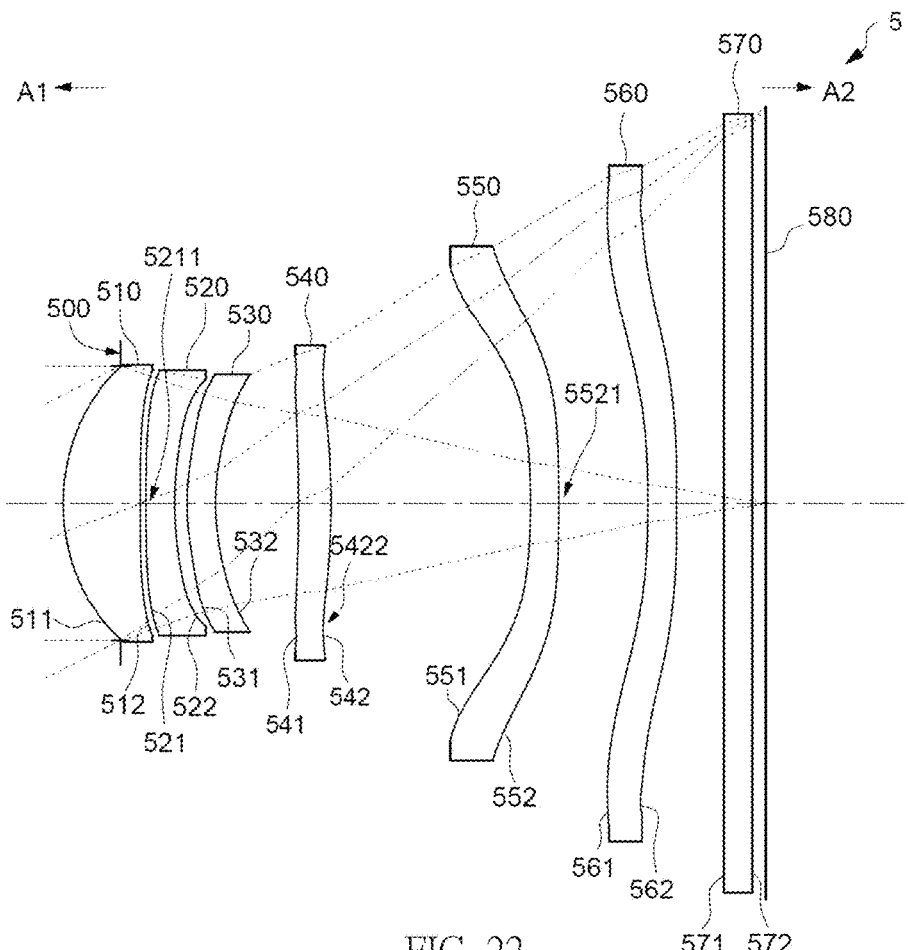
FIG. 22 depicts a cross-sectional view of a fifth embodiment of an optical imaging lens having six lens elements according to the present disclosure.
Figure 23:
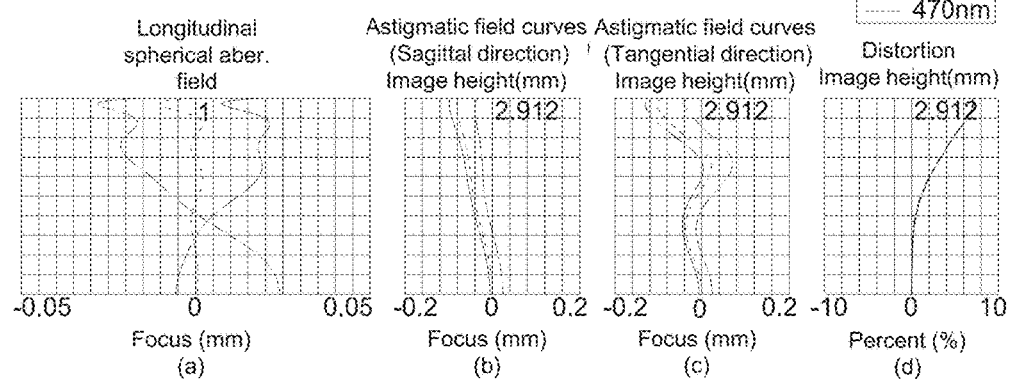
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having six lens elements according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment may be similar to those in the first embodiment for the similar elements, but here the reference numbers may be initialed with 5; for example, reference number 531 may label the object-side surface of the third lens element 530, reference number 532 may label the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, a fifth lens element 550 and a sixth lens element 560.

The arrangements of the convex or concave surface structures, including the object-side surfaces 511, 531, 541, 551, 561 and the image-side surfaces 512, 522, 532, 562 may be generally similar to the optical imaging lens 1, but the differences between the optical imaging lens 1 (FIG. 6 depicting the first example embodiment) and the optical imaging lens 5 (FIG. 22 depicting the fifth example embodiment) may include the convex or concave surface structure of the object-side surface 521 and image-side surfaces 542 and 552. Additional differences may include a radius of curvature, a thickness, aspherical data, and an effective focal length of each lens element. More specifically, the object-side surface 521 of the second lens element 520 may include a convex portion 5211 in a vicinity of the optical axis, the image-side surface 542 of the fourth lens element 540 may include a concave portion 5422 in a vicinity of a periphery of the fourth lens element 540, and the image-side surface 552 of the fifth lens element 550 may include a convex portion 5521 in a vicinity of the optical axis.

Here, in the interest of clearly showing the drawings of a particular embodiment, only the surface shapes which are different from that in the first embodiment may be labeled. FIG. 24 depicts the optical characteristics of each lens elements in the optical imaging lens 5 of the present embodiment.

From the vertical deviation of each curve shown in FIG. 23(*a*), the offset of the off-axis light relative to the image point may be within about ±0.03 mm. Referring to FIG. 23(*b*), the focus variation with respect to the three different wavelengths (470 nm, 555 nm, 650 nm) in the whole field may fall within about ±0.12 mm. Referring to FIG. 23(*c*), the focus variation with respect to the three different wavelengths (470 nm, 555 nm, 650 nm) in the whole field may fall within about ±0.16 mm. Referring to FIG. 23(*d*), the variation of the distortion aberration of the optical imaging lens 5 may be within about ±8%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 26:
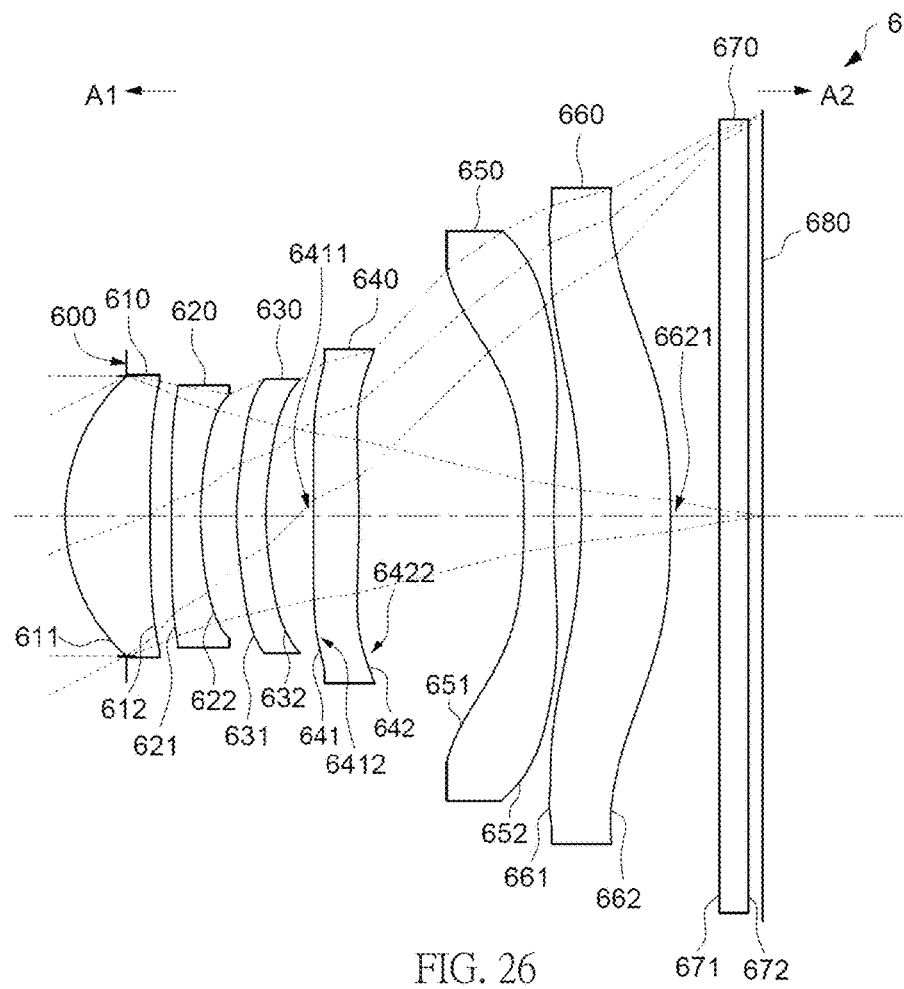
FIG. 26 depicts a cross-sectional view of a sixth embodiment of an optical imaging lens having six lens elements according to the present disclosure.
Figure 27:
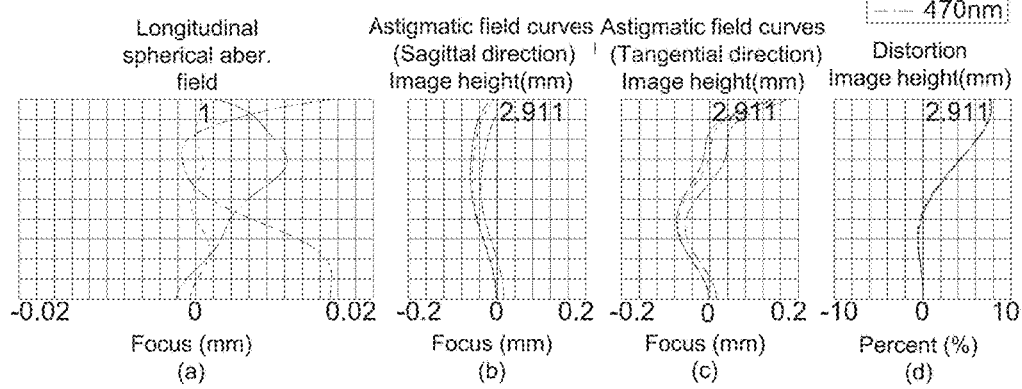
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having six lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6; for example, reference number 631 may label the object-side surface of the third lens element 630, reference number 632 may label the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650 and a sixth lens element 660.

The arrangements of the convex or concave surface structures, including the object-side surfaces 611, 621, 631, 651, 661 and the image-side surfaces 612, 622, 632, 652 may be generally similar to the optical imaging lens 1 (FIG. 6 depicting the first example embodiment), but the differences between the optical imaging lens 1 and the optical imaging lens 6 may include the convex or concave surface structures of the object-side surface 641 and the image-side surfaces 642 and 662. Additional differences may include a radius of curvature, refracting power, a thickness, aspherical data, and an effective focal length of each lens element. More specifically, the third lens element 630 has positive refracting power, the object-side surface 641 of the fourth lens element 640 may comprise a convex portion 6411 in a vicinity of the optical axis and a convex portion 6412 in a vicinity of a periphery of the fourth lens element 640, the image-side surface 642 of the fourth lens element 640 may include a concave portion 6422 in a vicinity of a periphery of the fourth lens element 640, the image-side surface 662 of the sixth lens element 660 may include a convex portion 6621 in a vicinity of the optical axis.

Here, in the interest of clearly showing the drawings of a particular embodiment, only the surface shapes which are different from that in the first embodiment may be labeled. Please refer to FIG. 28 for the optical characteristics of each lens elements in the optical imaging lens 6 of the present embodiment.

From the vertical deviation of each curve shown in FIG. 27(a), the offset of the off-axis light relative to the image point may be within about ±0.016 mm. Referring to FIG. 27(b), the focus variation with respect to the three different wavelengths (470 nm, 555 nm, 650 nm) in the whole field may fall within about ±0.08 mm. Referring to FIG. 23(c), the focus variation with respect to the three different wavelengths (470 nm, 555 nm, 650 nm) in the whole field may fall within about ±0.2 mm. Referring to FIG. 27(d), the variation of the distortion aberration of the optical imaging lens 6 may be within about ±8%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, TTL is smaller, and the imaging quality may be better (the value of longitudinal spherical aberration, astigmatism aberration, or distortion aberration may be smaller). Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 30:
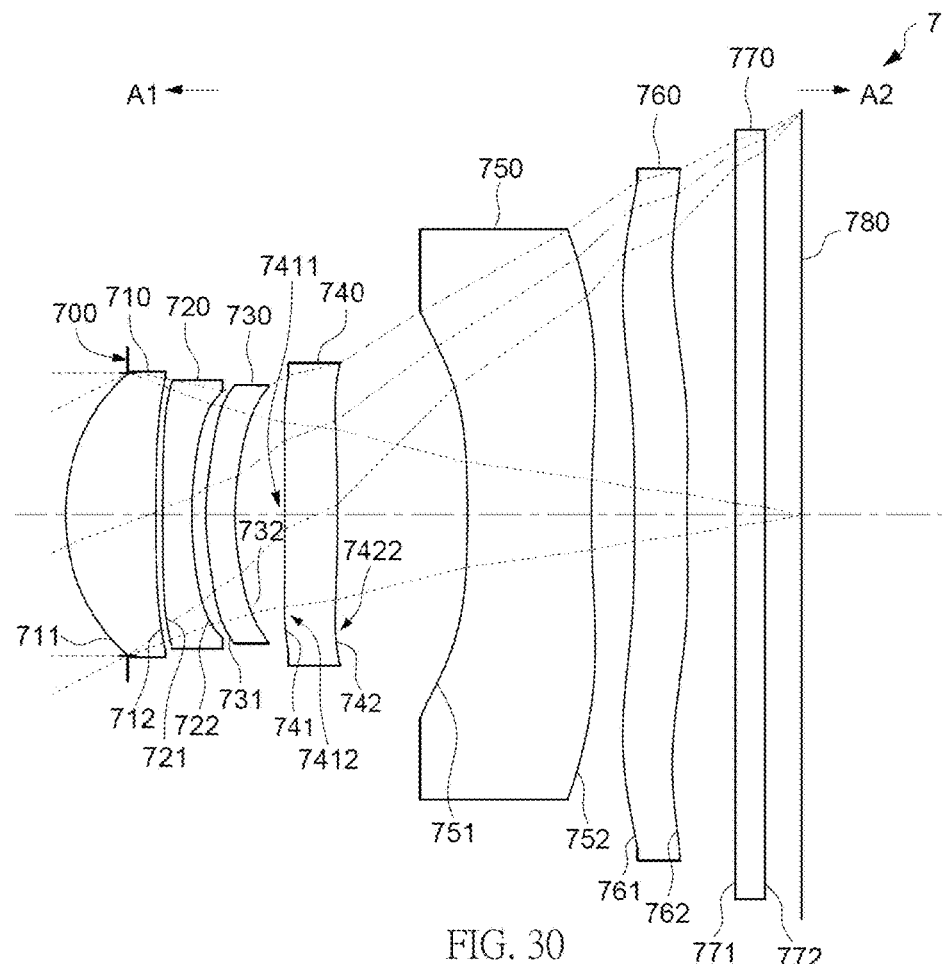
FIG. 30 depicts a cross-sectional view of a seventh embodiment of an optical imaging lens having six lens elements according to the present disclosure.
Figure 31:
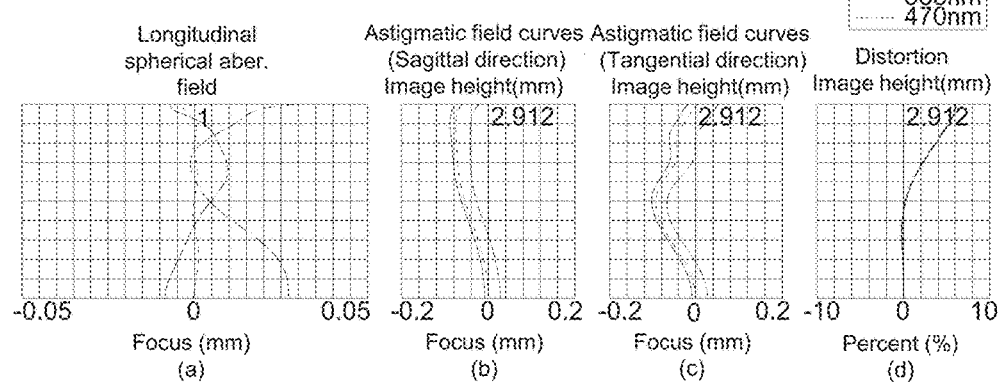
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having six lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7; for example, reference number 731 may label the object-side surface of the third lens element 730, reference number 732 may label the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, a fifth lens element 750 and a sixth lens element 760.

The arrangements of the convex or concave surface structures, including the object-side surfaces 711, 721, 731, 751, 761 and the image-side surfaces 712, 722, 732, 752, 762 may be generally similar to the optical imaging lens 1 (FIG. 6 depicting the first example embodiment), but the differences between the optical imaging lens 1 and the optical imaging lens 7 may include the convex or concave surface structures of the object-side surface 741 and the image-side surface 742. Additional differences may include a radius of curvature, refracting power, a thickness, aspherical data, and an effective focal length of each lens element. More specifically, the third lens element 730 has positive refracting power, the object-side surface 741 of the fourth lens element 740 may comprise a convex portion 7411 in a vicinity of the optical axis and a convex portion 7412 in a vicinity of a periphery of the fourth lens element 740, the image-side surface 742 of the fourth lens element 740 may comprise a concave portion 7422 in a vicinity of a periphery of the fourth lens element 740.

Here, in the interest of clearly showing the drawings of a particular embodiment, only the surface shapes which are different from that in the first embodiment may be labeled. Please refer to FIG. 32 for the optical characteristics of each lens elements in the optical imaging lens 7 of the present embodiment.

From the vertical deviation of each curve shown in FIG. 31(a), the offset of the off-axis light relative to the image point may be within about ±0.03 mm. Referring to FIG. 31(b), the focus variation with respect to the three different wavelengths (470 nm, 555 nm, 650 nm) in the whole field may fall within about ±0.12 mm. Referring to FIG. 31(c), the focus variation with respect to the three different wavelengths (470 nm, 555 nm, 650 nm) in the whole field may fall within about ±0.12 mm. Referring to FIG. 31(d), the variation of the distortion aberration of the optical imaging lens 7 may be within about ±6%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, the imaging quality may be better (the value of longitudinal spherical aberration, astigmatism aberration, or distortion aberration may be smaller). Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 34:
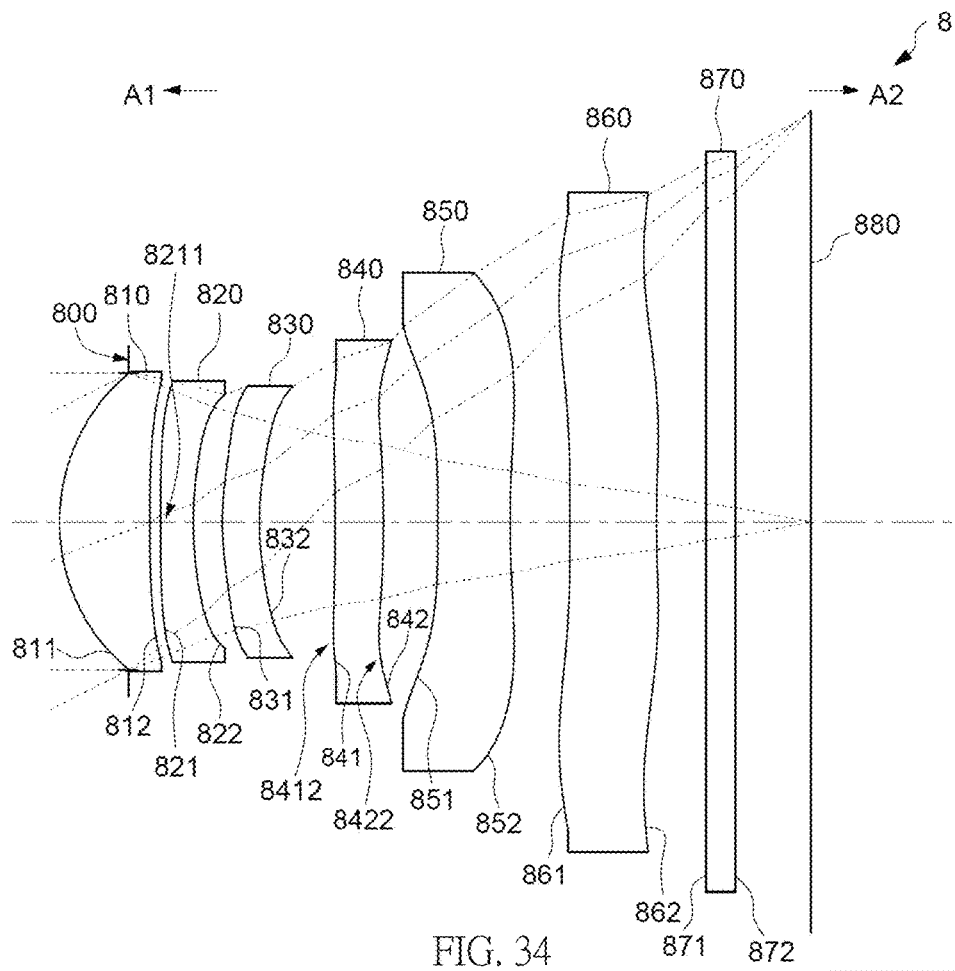
FIG. 34 depicts a cross-sectional view of an eighth embodiment of an optical imaging lens having six lens elements according to the present disclosure.
Figure 35:
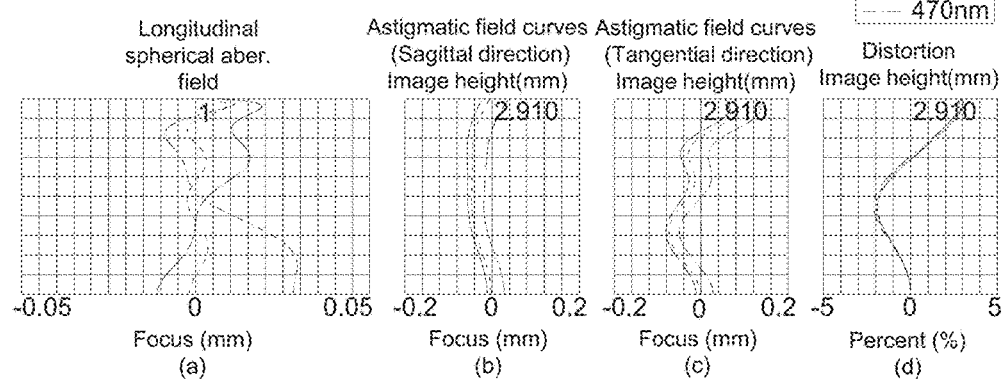
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having six lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8; for example, reference number 831 may label the object-side surface of the third lens element 830, reference number 832 may label the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850 and a sixth lens element 860.

The arrangements of the convex or concave surface structures, including the object-side surfaces 811, 831, 851, 861 and the image-side surfaces 812, 822, 832, 852, 862 may be generally similar to the optical imaging lens 1 (FIG. 6 depicting the first example embodiment), but the differences between the optical imaging lens 1 and the optical imaging lens 8 may include the convex or concave surface structures of the object-side surfaces 821 and 841 and the image-side surface 842. Additional differences may include a radius of curvature, refracting power, a thickness, aspherical data, and an effective focal length of each lens element. More specifically, the third lens element 830 has positive refracting power, the object-side surface 821 of the second lens element 820 may comprise a convex portion 8211 in a vicinity of the optical axis, the object-side surface 841 of the fourth lens element 840 may comprise a convex portion 8412 in a vicinity of a periphery of the fourth lens element 840, and the image-side surface 842 of the fourth lens element 840 may comprise a concave portion 8422 in a vicinity of a periphery of the fourth lens element 840.

Here, in the interest of clearly showing the drawings of a particular embodiment, only the surface shapes which are different from that in the first embodiment may be labeled. Please refer to FIG. 36 for the optical characteristics of each lens elements in the optical imaging lens 8 of the present embodiment.

From the vertical deviation of each curve shown in FIG. 35(a), the offset of the off-axis light relative to the image point may be within about ±0.03 mm. Referring to FIG. 35(b), the focus variation with respect to the three different wavelengths (470 nm, 555 nm, 650 nm) in the whole field may fall within about ±0.08 mm. Referring to FIG. 35(c), the focus variation with respect to the three different wavelengths (470 nm, 555 nm, 650 nm) in the whole field may fall within about ±0.16 mm. Referring to FIG. 35(d), the variation of the distortion aberration of the optical imaging lens 8 may be within about ±3%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, the imaging quality may be better (the value of longitudinal spherical aberration, astigmatism aberration, or distortion aberration may be smaller). Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 38:
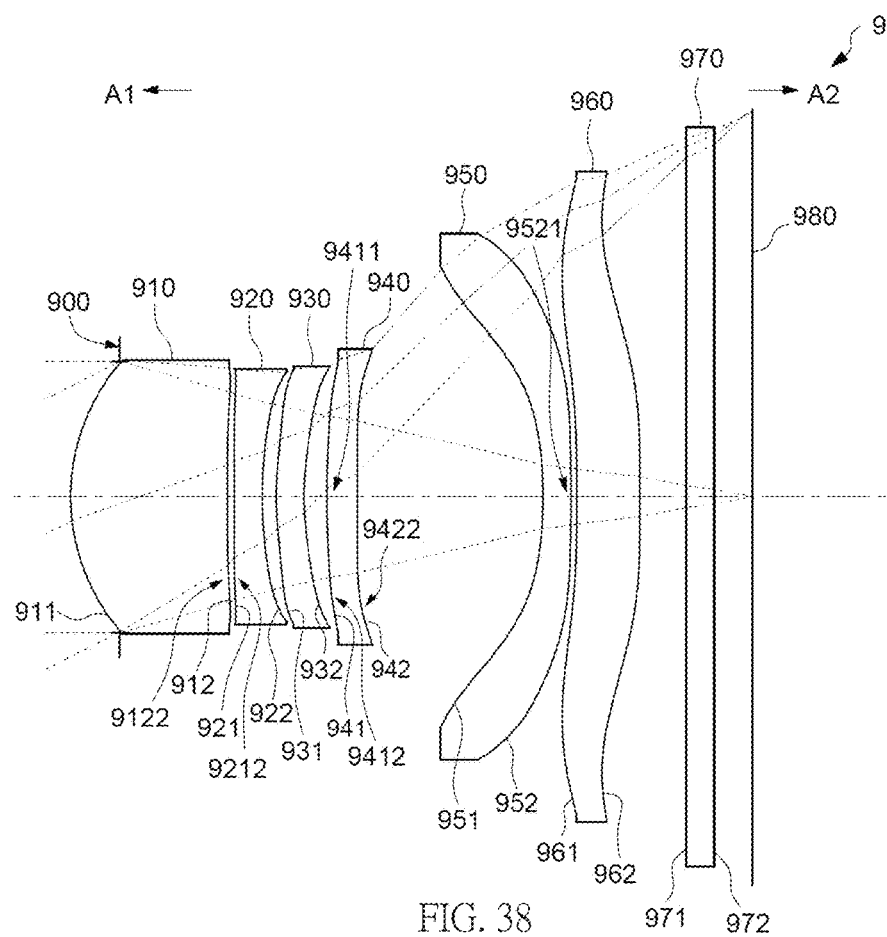
FIG. 38 depicts a cross-sectional view of a ninth embodiment of an optical imaging lens having six lens elements according to the present disclosure.
Figure 39:
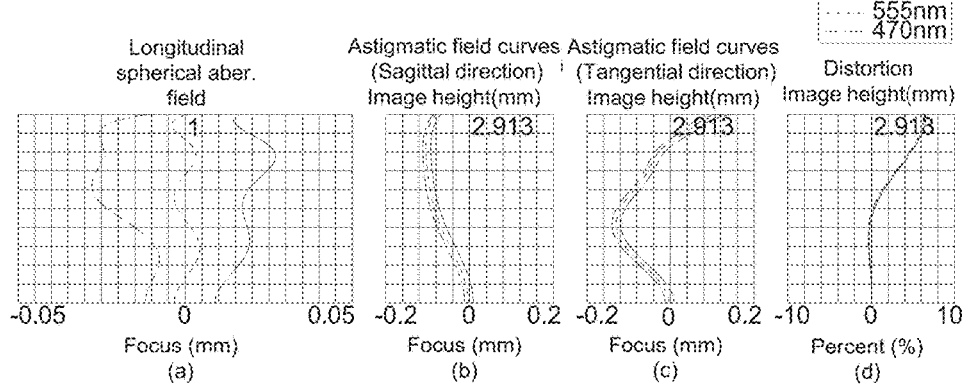
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having six lens elements according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9; for example, reference number 931 may label the object-side surface of the third lens element 930, reference number 932 may label the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950 and a sixth lens element 960.

The arrangements of the convex or concave surface structures, including the object-side surfaces 911, 931, 951, 961 and the image-side surfaces 922, 932, 962 may be generally similar to the optical imaging lens 1 (FIG. 6 depicting the first example embodiment), but the differences between the optical imaging lens 1 and the optical imaging lens 9 may include the convex or concave surface structures of the object-side surfaces 921 and 941 and the image-side surfaces 912, 942 and 952. Additional differences may include a radius of curvature, a thickness, aspherical data, and an effective focal length of each lens element. More specifically, the image-side surface 912 of the first lens element 910 may comprise a convex portion 9122 in a vicinity of a periphery of the first lens element 910, the object-side surface 921 of the second lens element 920 may comprise a concave portion 9212 in a vicinity of a periphery of the second lens element 920, the object-side surface 941 of the fourth lens element 940 may comprise a convex portion 941 in a vicinity of the optical axis and a convex portion 9412 in a vicinity of a periphery of the fourth lens element 940, the image-side surface 942 of the fourth lens element 940 may comprise a concave portion 9422 in a vicinity of a periphery of the fourth lens element 940, and the image-side surface 952 of the fifth lens element 950 may comprise a convex portion 9521 in a vicinity of the optical axis.

Here, in the interest of clearly showing the drawings of a particular embodiment, only the surface shapes which are different from that in the first embodiment may be labeled.

Please refer to FIG. 40 for the optical characteristics of each lens elements in the optical imaging lens 9 of the present embodiment.

From the vertical deviation of each curve shown in FIG. 39(a), the offset of the off-axis light relative to the image point may be within about ±0.03 mm. Referring to FIG. 39(b), the focus variation with respect to the three different wavelengths (470 nm, 555 nm, 650 nm) in the whole field may fall within about ±0.12 mm. Referring to FIG. 39(c), the focus variation with respect to the three different wavelengths (470 nm, 555 nm, 650 nm) in the whole field may fall within about ±0.16 mm. Referring to FIG. 39(d), the variation of the distortion aberration of the optical imaging lens 9 may be within about ±7%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, TTL is smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 42:
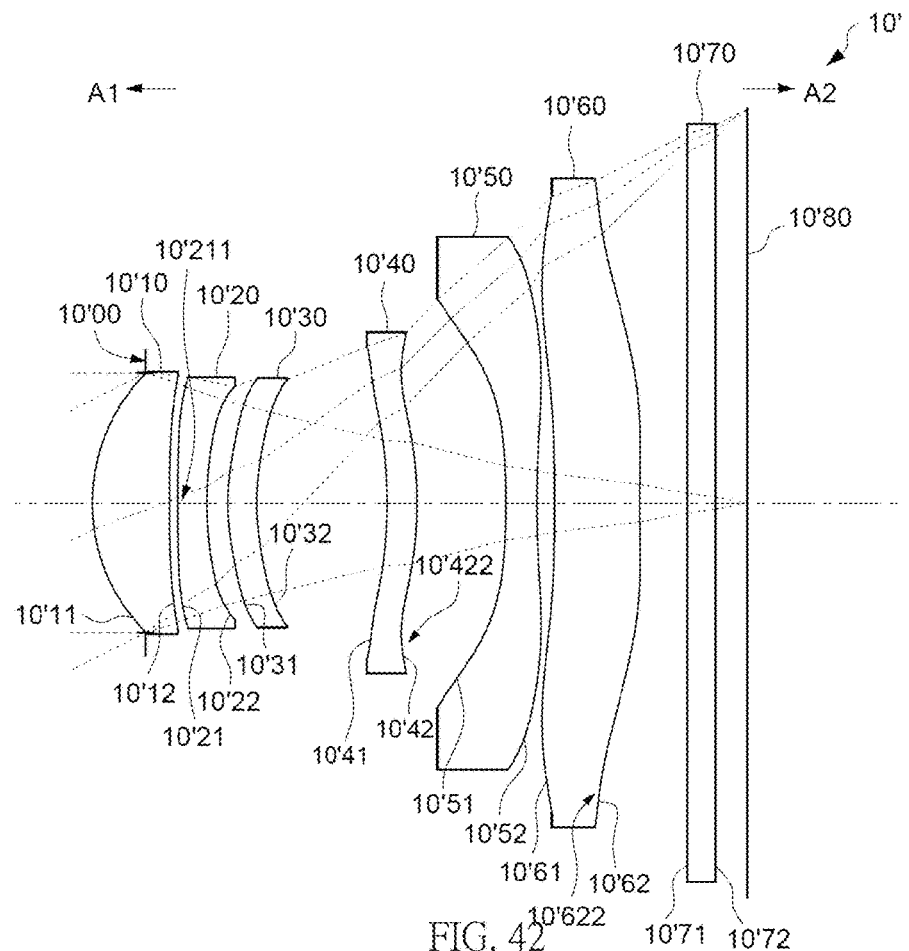
FIG. 42 depicts a cross-sectional view of a tenth embodiment of an optical imaging lens having six lens elements according to the present disclosure.
Figure 43:
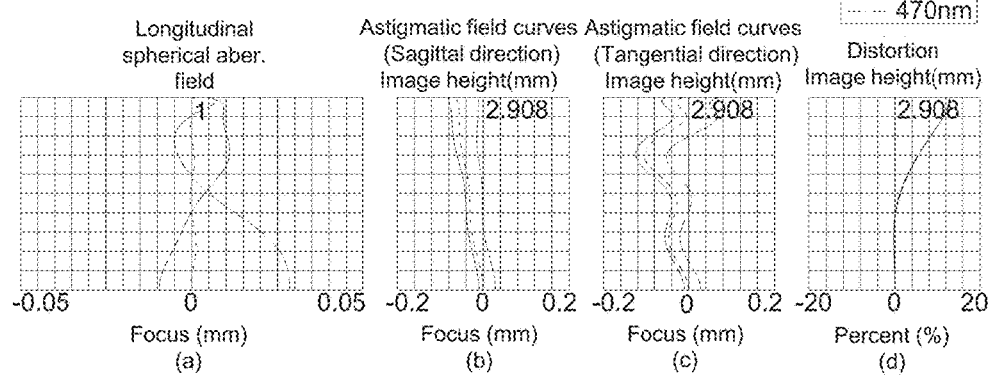
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10' having six lens elements according to an tenth example embodiment. FIG. 43 shows example charts of longitudinal spherical aberration and other kinds of optical aberrations of the optical imaging lens 10' according to the tenth embodiment. FIG. 44 shows an example table of optical data of each lens element of the optical imaging lens 10' according to the tenth example embodiment. FIG. 45 shows an example table of aspherical data of the optical imaging lens 10' according to the tenth example embodiment. The reference numbers labeled in the present embodiment are similar to those in the first embodiment for the similar elements, but here the reference numbers are initialed with 10'; for example, reference number 10'31 may label the object-side surface of the third lens element 10'30, reference number 10'32 may label the image-side surface of the third lens element 10'30, etc.

As shown in FIG. 42, the optical imaging lens 10' of the present embodiment, in an order from an object side A1 to an image side A2 along an optical axis, may comprise an aperture stop 10'00, a first lens element 10'10, a second lens element 10'20, a third lens element 10'30, a fourth lens element 10'40, a fifth lens element 10'50 and a sixth lens element 10'60.

The arrangements of the convex or concave surface structures, including the object-side surfaces 10'11, 10'31, 10'41, 10'51, 10'61 and the image-side surfaces 10'12, 10'22, 10'32, 10'52 may be generally similar to the optical imaging lens 1 (FIG. 6 depicting the first example embodiment), but the differences between the optical imaging lens 1 and the optical imaging lens 10' may include the convex or concave surface structures of the image-side surfaces 10'42 and 10'62. Additional differences may include a radius of curvature, a thickness, refracting power, aspherical data, and an effective focal length of each lens element. More specifically, the object-side surface 10'21 of the second lens element 10'20 may comprise a convex portion 10'211 in a vicinity of the optical axis, the third lens element 10'30 has positive refracting power, the image-side surface 10'42 of the fourth lens element 10'40 may comprise a concave portion 10'422 in a vicinity of a periphery of the fourth lens element 10'40, and the image-side surface 10'62 of the sixth lens element 10'60 may comprise a convex portion 10'622 in a vicinity of a periphery of the sixth lens element 10'60.

Here, in the interest of clearly showing the drawings of a particular embodiment, only the surface shapes which are different from that in the first embodiment may be labeled. Please refer to FIG. 44 for the optical characteristics of each lens elements in the optical imaging lens 10' of the present embodiment.

From the vertical deviation of each curve shown in FIG. 43(a), the offset of the off-axis light relative to the image point may be within about ±0.03 mm. Referring to FIG. 43(b), the focus variation with respect to the three different wavelengths (470 nm, 555 nm, 650 nm) in the whole field may fall within about ±0.08 mm. Referring to FIG. 43(c), the focus variation with respect to the three different wavelengths (470 nm, 555 nm, 650 nm) in the whole field may fall within about ±0.14 mm. Referring to FIG. 43(d), the variation of the distortion aberration of the optical imaging lens 10' may be within about ±14%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, TTL may be smaller, and the imaging quality may be better (the value of longitudinal spherical aberration, astigmatism aberration, or distortion aberration may be smaller). Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 46:
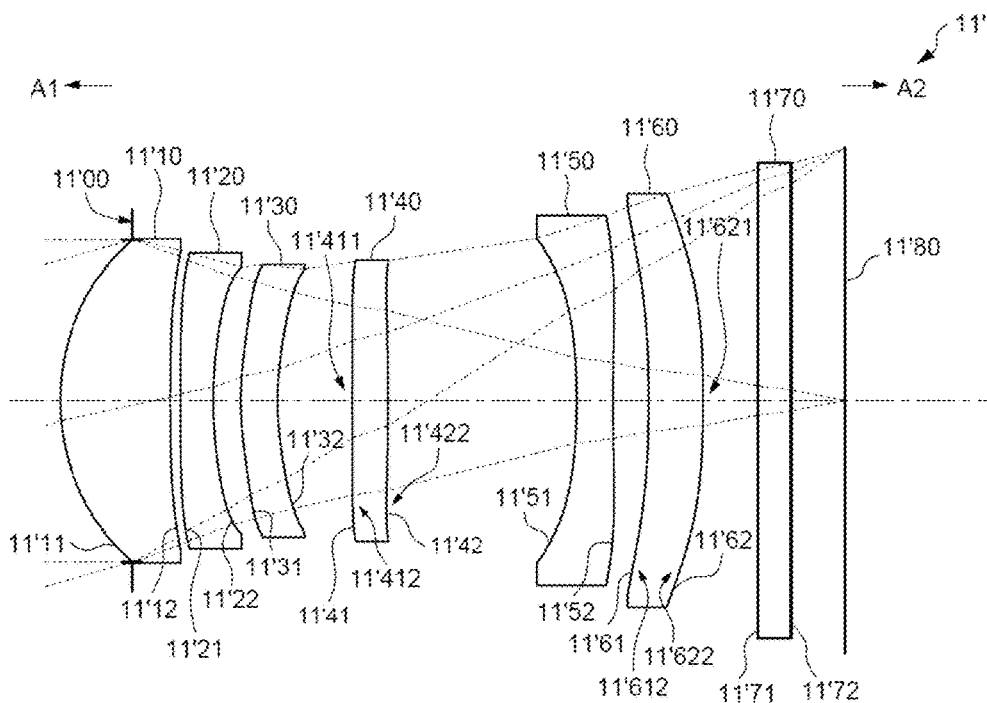
FIG. 46 depicts a cross-sectional view of an eleventh embodiment of an optical imaging lens having six lens elements according to the present disclosure.
Figure 47:
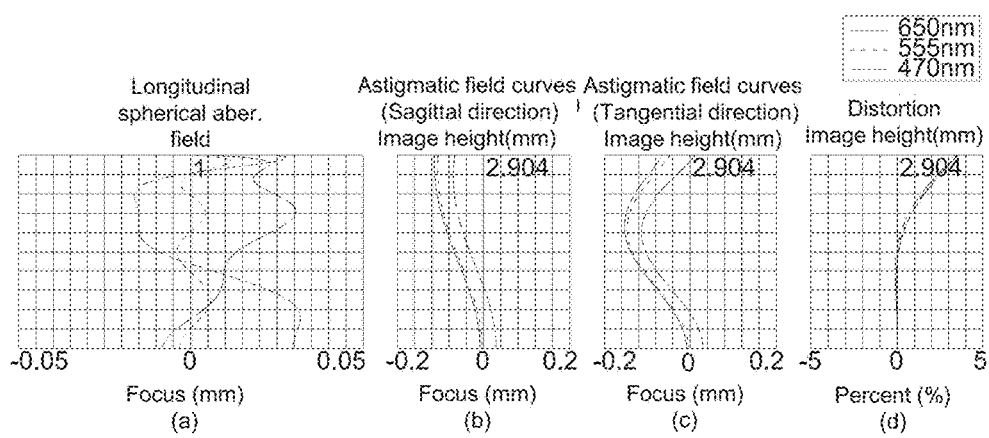
FIG. 47 depicts a chart of longitudinal spherical aberration and other kinds of optical aberrations of an eleventh embodiment of the optical imaging lens according to the present disclosure.

Reference is now made to FIGS. 46-49. FIG. 46 illustrates an example cross-sectional view of an optical imaging lens 11' having six lens elements according to an eleventh example embodiment. FIG. 47 shows example charts of longitudinal spherical aberration and other kinds of optical aberrations of the optical imaging lens 11' according to the eleventh embodiment. FIG. 48 shows an example table of optical data of each lens element of the optical imaging lens 11' according to the eleventh example embodiment. FIG. 49 shows an example table of aspherical data of the optical imaging lens 11' according to the eleventh example embodiment. The reference numbers labeled in the present embodiment are similar to those in the first embodiment for the similar elements, but here the reference numbers are initialed with 11'; for example, reference number 11'31 may label the object-side surface of the third lens element 11'30, reference number 11'32 may label the image-side surface of the third lens element 11'30, etc.

As shown in FIG. 46, the optical imaging lens 11' of the present embodiment, in an order from an object side A1 to an image side A2 along an optical axis, may comprise an aperture stop 11'00, a first lens element 11'10, a second lens element 11'20, a third lens element 11'30, a fourth lens element 11'40, a fifth lens element 11'50 and a sixth lens element 11'60.

The arrangements of the convex or concave surface structures, including the object-side surfaces 11'11, 11'21, 11'31, 11'51 and the image-side surfaces 11'12, 11'22, 11'32, 11'52 may be generally similar to the optical imaging lens 1 (FIG. 6 depicting the first example embodiment), but the differences between the optical imaging lens 1 and the optical imaging lens 11' may include the convex or concave surface structures of the object-side surfaces 11'41 and 11'61 and the image-side surfaces 11'42 and 11'62. Additional differences may include a radius of curvature, a thickness, refracting power, aspherical data, and an effective focal length of each lens element. More specifically, the third lens element 11'30 has positive refracting power, the object-side surface 11'41 of the fourth lens element 11'40 may comprise a convex portion 11'411 in a vicinity of the optical axis and a convex portion 11'412 in a vicinity of a periphery of the fourth lens element 11'40, the image-side surface 11'42 of the fourth lens element 11'40 may comprise a concave portion 11'422 in a vicinity of a periphery of the fourth lens element 11'40, the object-side surface 11'61 of the sixth lens element 11'60 may comprise a concave portion 11'612 in a vicinity of a periphery of the sixth lens element 11'60, and the image-side surface 11'62 of the sixth lens element 11'60 may comprise a convex portion 11'621 in a vicinity of the optical axis and a convex portion 11'622 in a vicinity of a periphery of the sixth lens element 11'60.

Here, in the interest of clearly showing the drawings of a particular embodiment, only the surface shapes which are different from that in the first embodiment may be labeled. Please refer to FIG. 48 for the optical characteristics of each lens elements in the optical imaging lens 11' of the present embodiment.

From the vertical deviation of each curve shown in FIG. 47(a), the offset of the off-axis light relative to the image point may be within about ±0.035 mm. Referring to FIG. 47(b), the focus variation with respect to the three different wavelengths (470 nm, 555 nm, 650 nm) in the whole field may fall within about ±0.12 mm. Referring to FIG. 47(c), the focus variation with respect to the three different wavelengths (470 nm, 555 nm, 650 nm) in the whole field may fall within about ±0.16 mm. Referring to FIG. 47(d), the variation of the distortion aberration of the optical imaging lens 11' may be within about ±4%.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of this embodiment may be referred to FIG. 50.

In comparison with the first embodiment, the imaging quality may be better (the value of longitudinal spherical aberration, astigmatism aberration, or distortion aberration may be smaller). Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

The values of EFL, T1, G12, T2, G23, T3, G34, T4, G45, T5, G56, T6, G6F, TF, GFP, BFL, ALT, AAG, TL, TTL, EFL/TTL, (T1+T2+G34+G56)/G45, (T1+T3+G34+G56)/G45, (T1+T4+G34+G56)/G45, (T2+G34+T5+G56+T6)/G45, (T3+G34+T5+G56+T6)/G45, (T4+G34+T5+G56+T6)/G45, ALT/(T1+G12+G23), AAG/(T1+G12+G23), BFL/(G12+G23), G34/(G12+G23), (T5+G56)/(G12+G23), T6/(G12+G23), EFL/(T1+G45), TL/(T1+G45) of all embodiment may be referred to in FIG. 50, and it is clear that the optical imaging lens of any one of the ten embodiments may satisfy the Inequalities (1) to (22).

The first lens element having positive refracting power may facilitate designing an optical imaging lens having smaller length and a telephoto function. Either of the object-side surface and image-side surface of the second lens element being an aspherical surface may facilitate regulating the aberration of the total optical imaging lens. The arrangements comprising the image-side surface of the fourth lens element having a convex portion in a vicinity of the optical axis, the fifth lens element having negative refracting power, and the object-side surface of the sixth lens element having a concave portion in a vicinity of the optical axis may facilitate designing the optical imaging lens having telephoto function. The arrangements comprising the image-side surface of the third lens element having a concave portion in a vicinity of a periphery of the third lens element, the object-side surface of the fifth lens element having a concave portion in a vicinity of the optical axis, or the image-side surface of the fifth lens element having a convex portion in a vicinity of a periphery of the fifth lens element may facilitate increasing the yield of the optical imaging lens. When the values of f1 and f2 satisfy the inequality: $1.5 \times |f1| > |f2|$, the difference between the values of f1 and f2 is not large so that the aberration regulation is not affected by f1 and f2. When the values of f1 and TTL satisfy the inequality: f1>TTL/2, the value of f1 is not small to facilitate to design the optical imaging lens having telephoto function. When the values of EFL and TTL satisfy the inequality: EFL/TTL≥1.000, the field of view may become smaller and the imaging on the image plane may be enlarged such that it is beneficial to a telescope design for the optical imaging lens, wherein a more advantageous range is 1.000 c EFL/TTL≤1.500, and the difficulty for designing and manufacturing the optical imaging lens may be decreased when the values of EFL and TTL satisfy the inequality: 1.000≤EFL/TTL≤1.500. An optical imaging lens can be used in a mobile electronic device if its length is smaller than 15 mm. An optical imaging lens can used in a thin mobile electronic device if its length is smaller than 9 mm. An optical imaging lens can be used in a very thin mobile electronic device if its length is between 3 mm and 6.5 mm. According to the length limitations described above, the aperture stop may be larger and the cost of the optical imaging lens having telephoto function may be decreased.

When the values of v1, v2, v4 and v6 satisfy any one of inequalities: v1>v2+v4, v1>v2+v6, and v1>v4+v6, the chromatic aberration of the optical imaging lens may be revised and an optical imaging lens having telephoto function can be developed.

When the value of any one of optical parameters is too big, it may not be advantageous to revise the aberration of the optical imaging lens. When the value of any one of optical parameters is too small, it may be difficult to manufacture the optical imaging lens. In order to promote and maintain appropriate values of the focal length and other optical parameters, the optical imaging lens may satisfy any one of inequalities as follows: EFL/(T1+G45)≤6.000, and a more advantageous range is 1.700≤EFL/(T1+G45)≤6.000.

When the value of any one of optical parameters is too large, it may not be advantageous to decrease the length of the optical imaging lens. When the value of any one of optical parameters is too small, it may be difficult to manufacture or assemble the optical imaging lens. For maintaining appropriate values of the thickness of each lens element and the gap between two adjacent lens element, the optical imaging lens may satisfy any one of inequalities as follows:

(T1+T2+G34+G56)/G45≤8.000, and 1.000≤(T1+T2+G34+G56)/G45≤8.000 is a more advantage range;
(T1+T3+G34+G56)/G45≤7.800, and 1.000≤(T1+T3+G34+G56)/G45≤7.800 is a more advantage range;
(T1+T4+G34+G56)/G45≤8.000, and 1.000≤(T1+T4+G34+G56)/G45≤8.000 is a more advantage range;
(T2+G34+T5+G56+T6)/G45≤6.000, and 0.800≤(T2+G34+T5+G56+T6)/G45≤6.000 is a more advantage range;
(T3+G34+T5+G56+T6)/G45≤6.600, and 0.800≤(T3+G34+T5+G56+T6)/G45≤6.600 is a more advantage range;
(T4+G34+T5+G56+T6)/G45≤6.300, and 0.800≤(T4+G34+T5+G56+T6)/G45≤6.300 is a more advantage range;
ALT/(T1+G12+G23)≤5.000, and 1.100≤ALT/(T1+G12+G23)≤5.000 is a more advantage range;
AAG/(T1+G12+G23)≤4.500, and 1.100≤AAG/(T1+G12+G23)≤4.500 is a more advantage range;
BFL/(G12+G23)≤5.500, and 1.500≤BFL/(G12+G23)≤5.500 is a more advantage range;
G34/(G12+G23)≤4.500, and 0.800≤G34/(G12+G23)≤4.500 is a more advantage range;
(T5+G56)/(G12+G23)≤8.000, and 1.000≤(T5+G56)/(G12+G23)≤8.000 is a more advantage range;
T6/(G12+G23)≤3.000, and 1.000≤T6/(G12+G23)≤3.000 is a more advantage range;
TL/(T1+G45)≤5.000, and 1.300≤TL/(T1+G45)≤5.000 is a more advantage range.

Moreover, the optical parameters according to one embodiment could be selectively incorporated in other embodiments to limit and enhance the structure of the optical lens assembly.

In consideration of the non-predictability of the optical lens assembly, while the optical lens assembly may satisfy any one of inequalities described above, the optical lens assembly herein perfectly may achieve a shorten length, provide an enlarged aperture stop, increase an imaging quality and/or assembly yield, and/or effectively improve drawbacks of a typical optical lens assembly.

Any one of the aforementioned inequalities may be selectively incorporated in other inequalities to apply to the present embodiments, and as such are not limiting. Embodiments according to the present disclosure are not limiting and may be selectively incorporated in other embodiments described herein. In some embodiments, more details about the parameters may be incorporated to enhance the control for the system performance and/or resolution. For example, the object-side surface of the first lens element may comprise a convex portion in a vicinity of the optical axis. It is noted that the details listed here may be incorporated into example embodiments if no inconsistency occurs.

Additionally, the combination of the optical parameters disclosed in the various embodiments of the present invention may be represented ranges of values defined by minimum and maximum values of each term. As such, values within the ranges of maximum and/or minimum values of each term may be contemplated and/or otherwise utilized herein.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising sequentially from an object side to an image side along an optical axis: a first lens element, a second lens element, a third lens element, a fourth lens element, a fifth lens element and a sixth lens element, each of the first, second, third, fourth, fifth and sixth lens elements having an object-side surface facing toward the object side and an image-side surface facing toward the image side, wherein:

the first lens element has positive refracting power;
the object-side surface of the second lens element or the image-side surface of the second lens element is an aspherical surface;
the image-side surface of the third lens element comprises a concave portion in a vicinity of a periphery of the third lens element;
the image-side surface of the fourth lens element comprises a convex portion in a vicinity of the optical axis;
the fifth lens element has negative refracting power;
the object-side surface of the sixth lens element comprises a concave portion in a vicinity of the optical axis;
a focal length of the first lens element is represented by f1, a focal length of the second lens element is represented by f2, a distance between the object-side surface of the first lens element and an image plane along the optical axis is represented by TTL, an effective focal length of the optical imaging lens is represented by EFL, and the optical imaging lens satisfies inequalities:

$1.5 \times |f1| > |f2|$;

$f1 > TTL/2$;

$EFL/TTL \geq 1.000$; and $TTL \leq 15$ mm.

2. The optical imaging lens according to claim 1, wherein an Abbe number of the first lens element is represented by v1, an Abbe number of the second lens element is represented by v2, an Abbe number of the fourth lens element is represented by v4, and
wherein the optical imaging lens further satisfies an inequality: v1>v2+v4.

3. The optical imaging lens according to claim 1, wherein a central thickness of the first lens element along the optical axis is represented by T1, a central thickness of the second lens element along the optical axis is represented by T2, an air gap between the third lens element and the fourth lens element along the optical axis is represented by G34, an air gap between the fourth lens element and the fifth lens element along the optical axis is represented by G45, an air gap between the fifth lens element and the sixth lens element along the optical axis is represented by G56, and wherein the optical imaging lens further satisfies an inequality: (T1+T2+G34+G56)/G45≤8.000.

4. The optical imaging lens according to claim 1, wherein a central thickness of the second lens element along the optical axis is represented by T2, a central thickness of the fifth lens element along the optical axis is represented by T5, a central thickness of the sixth lens element along the optical axis is represented by T6, an air gap between the third lens element and the fourth lens element along the optical axis is represented by G34, an air gap between the fourth lens element and the fifth lens element along the optical axis is represented by G45, and an air gap between the fifth lens element and the sixth lens element along the optical axis is represented by G56, and wherein the optical imaging lens further satisfies an inequality: (T2+G34+T5+G56+T6)/G45≤6.000.

5. The optical imaging lens according to claim 1, wherein a sum of central thicknesses from the first to the sixth lens elements along the optical axis is represented by ALT, a central thickness of the first lens element along the optical axis is represented by T1, an air gap between the first lens element and the second lens element along the optical axis is represented by G12, an air gap between the second lens element and the third lens element along the optical axis is represented by G23, and wherein the optical imaging lens further satisfies an inequality: ALT/(T1+G12+G23)≤5.000.

6. The optical imaging lens according to claim 1, wherein an air gap between the first lens element and the second lens element along the optical axis is represented by G12, an air gap between the second lens element and the third lens element along the optical axis is represented by G23, an air gap between the third lens element and the fourth lens element along the optical axis is represented by G34, and wherein the optical imaging lens further satisfies an inequality: G34/(G12+G23)≤4.500.

7. The optical imaging lens according to claim 1, wherein an effective focal length of the optical imaging lens is represented by EFL, a central thickness of the first lens element along the optical axis is represented by T1, an air gap between the fourth lens element and the fifth lens element along the optical axis is represented by G45, and wherein the optical imaging lens further satisfies an inequality: EFL/(T1+G45)≤6.000.

8. An optical imaging lens, sequentially from an object side to an image side along an optical axis, comprising first, second, third, fourth, fifth and sixth lens elements, each of the first, second, third, fourth, fifth and sixth lens elements having an object-side surface facing toward the object side, an image-side surface facing toward the image side, wherein:

the first lens element has positive refracting power;
the object-side surface of the second lens element or the image-side surface of the second lens element is an aspherical surface;
the image-side surface of the fourth lens element comprises a convex portion in a vicinity of the optical axis;
the fifth lens element has negative refracting power;
the object-side surface of the fifth lens element comprises a concave portion in a vicinity of the optical axis;
the object-side surface of the sixth lens element comprises a concave portion in a vicinity of the optical axis;
a focal length of the first lens element is represented by f1, a focal length of the second lens element is represented by f2, a distance between the object-side surface of the first lens element and an image plane along the optical axis is represented by TTL, an effective focal length of the optical imaging lens is represented by EFL, and the optical imaging lens satisfies inequalities:

$1.5 \times |f1| > |f2|$;

$f1 > TTL/2$;

$EFL/TTL \geq 1.000$; and $TTL \leq 15$ mm.

9. The optical imaging lens according to claim 8, wherein an Abbe number of the first lens element is represented by v1, an Abbe number of the second lens element is represented by v2, an Abbe number of the sixth lens element is represented by v6, and wherein the optical imaging lens further satisfies an inequality: v1>v2+v6.

10. The optical imaging lens according to claim 8, wherein a central thickness of the first lens element along the optical axis is represented by T1, a central thickness of the third lens element along the optical axis is represented by T3, an air gap between the third lens element and the fourth lens element along the optical axis is represented by G34, an air gap between the fourth lens element and the fifth lens element along the optical axis is represented by G45, an air gap between the fifth lens element and the sixth lens element along the optical axis is represented by G56, and wherein the optical imaging lens further satisfies an inequality: (T1+T3+G34+G56)/G45≤7.800.

11. The optical imaging lens according to claim 8, wherein a central thickness of the third lens element along the optical axis is represented by T3, a central thickness of the fifth lens element along the optical axis is represented by T5, a central thickness of the sixth lens element along the optical axis is represented by T6, an air gap between the third lens element and the fourth lens element along the optical axis is represented by G34, an air gap between the fourth lens element and the fifth lens element along the optical axis is represented by G45, an air gap between the fifth lens element and the sixth lens element along the optical axis is represented by G56, and wherein the optical imaging lens further satisfies an inequality: (T3+G34+T5+G56+T6)/G45≤6.600.

12. The optical imaging lens according to claim 8, wherein a sum of air gaps from the first to the sixth lens elements along the optical axis is represented by AAG, a central thickness of the first lens element along the optical axis is represented by T1, an air gap between the first lens element and the second lens element along the optical axis is represented by G12, an air gap between the second lens element and the third lens element along the optical axis is represented by G23, and wherein the optical imaging lens further satisfies an inequality: AAG/(T1+G12+G23)≤4.500.

13. The optical imaging lens according to claim 8, wherein a central thickness of the fifth lens element along the optical axis is represented by T5, an air gap between the first lens element and the second lens element along the optical axis is represented by G12, an air gap between the second lens element and the third lens element along the optical axis is represented by G23, an air gap between the fifth lens element and the sixth lens element along the optical axis is represented by G56, and wherein the optical imaging lens further satisfies an inequality: (T5+G56)/(G12+G23)≤8.000.

14. The optical imaging lens according to claim 8, wherein a distance from the object-side surface of the first lens element to the image-side surface of the sixth lens element along the optical axis is represented by TL, a central thickness of the first lens element along the optical axis is represented by T1, an air gap between the fourth lens element and the fifth lens element along the optical axis is represented by G45, and wherein the optical imaging lens further satisfies an inequality: TL/(T1+G45)≤5.000.

15. An optical imaging lens, sequentially from an object side to an image side along an optical axis, comprising first, second, third, fourth, fifth and sixth lens elements, each of the first, second, third, fourth, fifth and sixth lens elements having an object-side surface facing toward the object side, an image-side surface facing toward the image side, wherein:

the first lens element has positive refracting power;
the object-side surface of the second lens element or the image-side surface of the second lens element is an aspherical surface;
the image-side surface of the fourth lens element comprises a convex portion in a vicinity of the optical axis;
the fifth lens element has negative refracting power;
the image-side surface of the fifth lens element comprises a convex portion in a vicinity of a periphery of the fifth lens element;
the object-side surface of the sixth lens element comprises a concave portion in a vicinity of the optical axis;
a focal length of the first lens element is represented by f1, a focal length of the second lens element is represented by f2, a distance between the object-side surface of the first lens element and an image plane along the optical axis is represented by TTL, an effective focal length of the optical imaging lens is represented by EFL, and the optical imaging lens satisfies inequalities:

$1.5 \times |f1| > |f2|$;

$f1 > TTL/2$;

$EFL/TTL \geq 1.000$; and $TTL \leq 9$ mm.

16. The optical imaging lens according to claim 15, wherein an Abbe number of the first lens element is represented by v1, an Abbe number of the fourth lens element is represented by v4, an Abbe number of the sixth lens element is represented by v6, and wherein the optical imaging lens further satisfies an inequality: v1>v4+v6.

17. The optical imaging lens according to claim 15, wherein a central thickness of the first lens element along the optical axis is represented by T1, a central thickness of the fourth lens element along the optical axis is represented by T4, an air gap between the third lens element and the fourth lens element along the optical axis is represented by G34, an air gap between the fourth lens element and the fifth lens element along the optical axis is represented by G45, an air gap between the fifth lens element and the sixth lens element along the optical axis is represented by G56, and wherein the optical imaging lens further satisfies an inequality: (T1+T4+G34+G56)/G45≤8.000.

18. The optical imaging lens according to claim 15, wherein a central thickness of the fourth lens element along the optical axis is represented by T4, a central thickness of the fifth lens element along the optical axis is represented by T5, a central thickness of the sixth lens element along the optical axis is represented by T6, an air gap between the third lens element and the fourth lens element along the optical axis is represented by G34, an air gap between the fourth lens element and the fifth lens element along the optical axis is represented by G45, an air gap between the fifth lens element and the sixth lens element along the optical axis is represented by G56, and wherein the optical imaging lens further satisfies an inequality: (T4+G34+T5+G56+T6)/G45≤6.300.

19. The optical imaging lens according to claim 15, wherein a distance from the image-side surface of the sixth lens element to an image plane along the optical axis is represented by BFL, an air gap between the first lens element and the second lens element along the optical axis is represented by G12, an air gap between the second lens element and the third lens element along the optical axis is represented by G23, and wherein the optical imaging lens further satisfies an inequality: BFL/(G12+G23)≤5.500.

20. The optical imaging lens according to claim 15, wherein a central thickness of the sixth lens element along the optical axis is represented by T6, an air gap between the first lens element and the second lens element along the optical axis is represented by G12, an air gap between the second lens element and the third lens element along the optical axis is represented by G23, and wherein the optical imaging lens further satisfies an inequality: T6/(G12+G23)≤3.000.

* * * * *